(12) United States Patent
Kim et al.

(10) Patent No.: US 12,303,073 B2
(45) Date of Patent: May 20, 2025

(54) BLENDER

(71) Applicant: LG ELECTRONICS INC., Seoul (KR)

(72) Inventors: Min Gyu Kim, Seoul (KR); Dae Yong Kang, Seoul (KR); Woonkyu Seo, Seoul (KR); Jin Hae Ye, Seoul (KR); Sang Jin Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 554 days.

(21) Appl. No.: 17/613,848

(22) PCT Filed: Aug. 6, 2020

(86) PCT No.: PCT/KR2020/010366
§ 371 (c)(1),
(2) Date: Nov. 23, 2021

(87) PCT Pub. No.: WO2021/029601
PCT Pub. Date: Feb. 18, 2021

(65) Prior Publication Data
US 2022/0225837 A1 Jul. 21, 2022

(30) Foreign Application Priority Data
Aug. 13, 2019 (KR) .................. 10-2019-0098870

(51) Int. Cl.
*A47J 43/07* (2006.01)
*A47J 43/046* (2006.01)

(52) U.S. Cl.
CPC ......... *A47J 43/0777* (2013.01); *A47J 43/046* (2013.01)

(58) Field of Classification Search
CPC .................. A47J 43/0777; A47J 43/046
USPC ........................................... 241/37.5
See application file for complete search history.

(56) References Cited

U.S. PATENT DOCUMENTS

| 2015/0265983 A1* | 9/2015 | Fleming | B01F 35/2131 |
| | | | 366/206 |
| 2016/0270598 A1* | 9/2016 | Vu | A47J 43/0777 |
| 2018/0020875 A1 | 1/2018 | Kolar et al. | |
| 2018/0255975 A1* | 9/2018 | Kolar | H04B 5/72 |

FOREIGN PATENT DOCUMENTS

| CN | 106163353 A | 11/2016 |
| KR | 10-0796634 B1 | 1/2008 |
| WO | 2017/118379 A1 | 7/2017 |

* cited by examiner

*Primary Examiner* — Adam J Eiseman
*Assistant Examiner* — Fred C Hammers
(74) *Attorney, Agent, or Firm* — Bryan Cave Leighton Paisner LLP

(57) ABSTRACT

A blender includes a container body in which food is accommodated, a main body provided underneath the container body and supporting the container body, a container lid detachably mounted on an upper surface of the container body and opening and closing the top of the container body, and a detection system detecting whether or not the container lid is mounted on the container body. A seating support is formed on an upper surface of the main body in a manner that protrudes upward therefrom to be stepped, and a bottom surface of the container body being seated on the seating support.

16 Claims, 22 Drawing Sheets

Fig.11
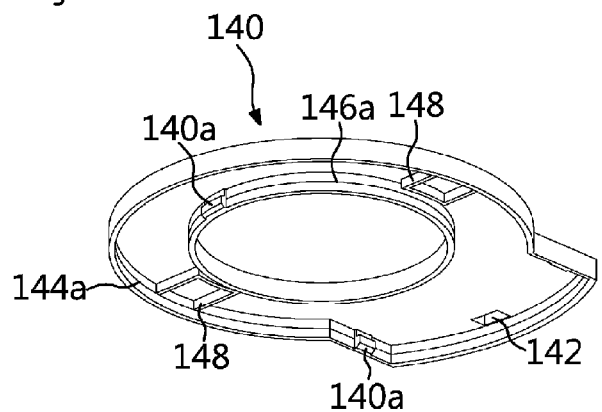
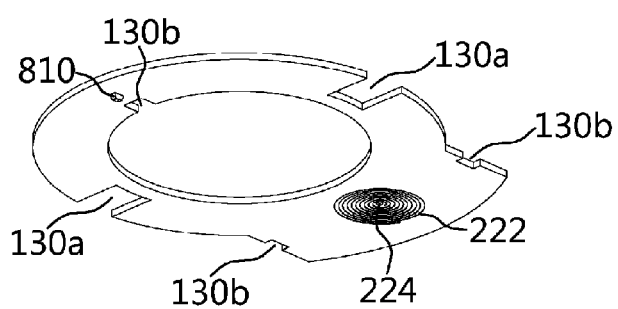
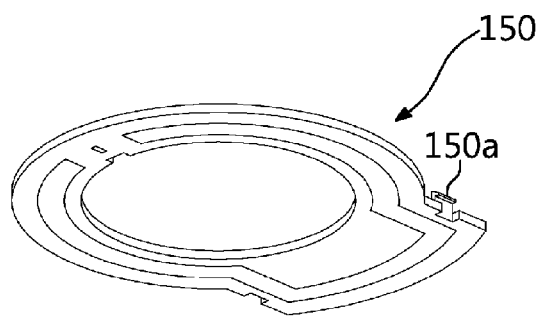

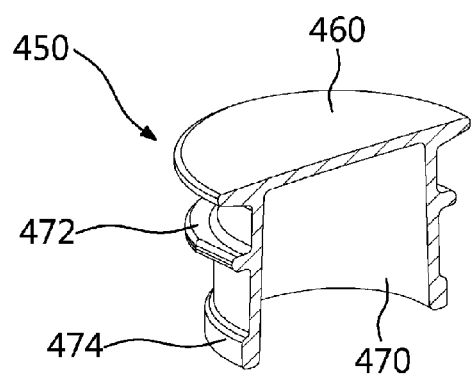
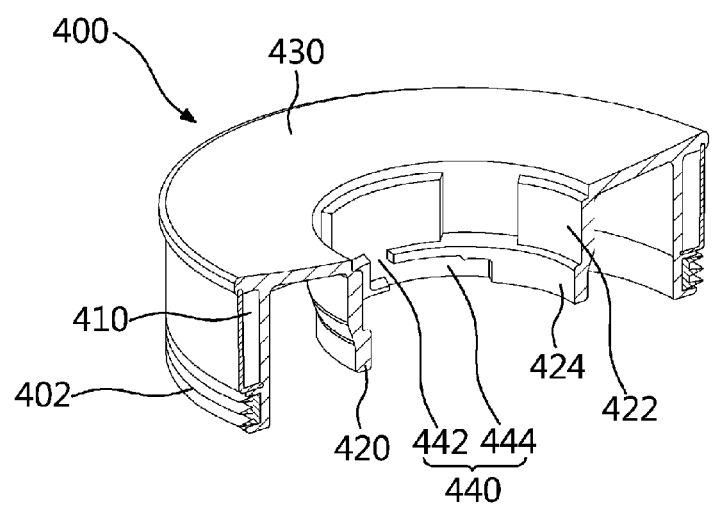

BLENDER

CROSS-REFERENCE TO RELATED APPLICATIONS

This application is a National Stage filing under 35 U.S.C. 371 of International Application No. PCT/KR2020/010366, with an international filing date of Aug. 6, 2020, which claims the benefit of KR Patent Application No. 10-2019-0098870, filed on Aug. 13, 2019, all of which are incorporated by reference in their entirety herein.

TECHNICAL FIELD

The present disclosure relates to a blender and, more particularly, to a blender including a transparent film capable of transmitting an electric signal, and thus detecting whether or not a container lid is attached.

BACKGROUND

Generally, a blender is also referred to as a mixer. The blender is used primarily to chop food accommodated in a container body into small pieces or mix the food by rotating a blade by a rotational force generated by a motor.

In a normal blender, a main body into which a motor operating by electricity is built is positioned below, and a container body in which the food is accommodated is seated on the top of the main body. A blade for chopping the food into small pieces or mixing the food is provided inside the container body and is rotated by a rotational force generated by the motor.

After the food that needs to be chopped into small pieces is put into the container body, an operational button or a knob of the main body is used to drive the motor. The blade is rotated by the rotational force generated by the motor, and thus the food inside the container body is chopped into small pieces or mixed.

In recent years, various blenders of this type have been developed to satisfy the user's need for food intake in their busy everyday life. For example, small-sized hand-held blenders or large-sized high-volume blenders have been developed, and blenders capable of chopping food at a high speed have also been developed.

In addition, vacuum blenders capable of slicing or grinding food accommodated in a container body under vacuum for foodstuff processing in a fresher state have been available on the market.

However, safety use, as well as the taste and nutrition of blender-chopped food, is of increasing importance for various types of blenders. That is, when a blade is rotated in a state where a container lid is not attached, the food accommodated inside a container body may be spill out to the outside. Furthermore, there is a concern in that safety-related accidents will occur. For example, a child may put their hand into the container lid.

Therefore, technologies for detecting whether or not the container lid is attached have been developed and disclosed.

For example, in U.S. Pat. Nos. 6,910,800 and 7,871,196, it is disclosed that a push pod which physically connects a container body and a main body is mounted and that a container lid, when attached on the container body, is pressed against the push rod.

Specifically, in U.S. Pat. No. 6,910,800, a link is formed along a flank surface of a container body in a manner that extends a long distance in the upward-downward direction. When a container lid above is attached, a protrusion thereon is pressed downward against an upper end portion of the link, and thus the lower end portion thereof is moved downward. In this manner, it is mechanically detected whether or not the container lid of the container body is attached.

In addition, in U.S. Pat. No. 7,871,196, instead of being provided in the flank surface of the container body, the link enabling the container lid to be attached in the upward-downward direction is provided inside a handle of the container body. That is, the push rod mounted in a manner that extends longitudinally in the upward-downward direction is mounted in a groove inside the handle. When the container lid is attached, the push rod is moved from upward to downward. Thus, a lower switch provided below is activated by the push rod and detects the container lid.

However, in U.S. Pat. No. 7,871,196, a separate push member, a push block, or the like needs to be mounted, and the link or the push rod that is formed in a manner that extends longitudinally in the upward-downward direction needs to be mounted according to its length. Thus, the link and the push are difficult to manufacture and mount. A detecting function may not perform because of wear and tear on or damage to the link and the push rod that results from the frequent use thereof. Furthermore, twisting, bending, or the like of the link or the push rod having a great length causes a failure to perform the detecting function.

The push member or a push detection unit needs to be separately mounted. Water may permeate into the push detection unit. The push detection may be contaminated with food. The push member of the container body and the push detection unit of the main body need to be mounted at positions, respectively, that correspond to each other, and thus the container body needs to be mounted in a specific direction.

In a related art, in a connection structure where a signal is transmitted in the upward-downward direction using a mechanical structure (or an electric wire), the container body is formed in a transparent or semi-transparent manner. In this case, at least one portion of the container body needs to be formed in an opaque manner so that a transmission mechanism or the electric wire is invisible from the outside. Thus, the degree of freedom in blender design is limited.

In addition, in a case where the mechanical structure (or the electric wire) is used, residues or a foreign material accumulates at a gap between a portion that the mechanical structure is attached to or detached from and the mechanical structure. Thus, contamination or leakage may occur.

In the related art, because a signal transmission mechanism is mounted in the handle, a structure of the handle is complex, and a structure needs to be mounted in a small space in the narrow handle. Thus, the structure is difficult to mount and to repair when malfunctioning. Furthermore, a signal transmission structure needs to be connected in the upward-downward direction through the handle. Accordingly, upper and lower end portions of the handle are always attached on the container body. Thus, the degree of freedom in blender design is limited.

In order to solve these problems, EPO Patent No.2548485 discloses a blender of which a main body recognizes attaching of a container lid on a container body using a wireless communication module when the container lid is attached on the container body.

However, in EPO Patent No.2548485, the wireless communication module needs to be provided between the container body and the main body. Furthermore, a separate power supply (a battery or a dry cell) for driving the wireless communication module needs to be provided in the container body.

Moreover, an error due to a communication traffic jam resulting from a plurality of communication channels may occur. That is, wireless power transfer or wireless communication also needs to be performed between the man body and an external power supply device (a cooktop or the like). In addition, a signal indicating whether or not the container lid is attached needs to be wirelessly transmitted between the container body and the main body. Thus, the communication traffic jam may occur.

In order to solve these problems in the related art, US Patent Application Publication No.20180020875 discloses an interlocking blending device. In the interlocking blending device, a transmission coil and a reception coil that constitute a pair is arranged in a main body, and a reception coil and a transmission coil that constitute a pair is correspondingly arranged in a container body. When a container lid is attached on the container body, electric power is transferred to the reception coil of the container body through the transmission coil of the main body. The electric power is transferred back to the reception coil of the main body through the transmission coil of the container body. Thus, the main body recognizes that a container lid is attached on the container body.

That is, US Patent Application Publication No.20180020875 discloses in the following structure. A push rod is mounted in the upward-downward direction along a flank surface of the container body, and a container-lid detection signal is mechanically transferred to under the container body. In addition, a circuit connected up to a lower portion of the container is open or closed according to whether a switch above a container turns on or off by the container lid. Accordingly, signal transmission is allowed or disabled.

However, in US Patent Application Publication No.20180020875, two coils, that is, the transmission coil and the reception coil need to be mounted in each of the main body and the container body. A device analyzing electric power received by the reception coil of the main body needs to be provided.

In addition, because two coils are arranged in each of the main body and the container body, in a case where electric current flows through each of the coils, a change in induced current occurs due to interference between magnetic fields developing at the coils. Thus, electric power received by the reception coil of the main body is also difficult to analyze precisely.

The transmission coil of the main body transfers electric power to the reception coil of the container body, and when the container lid is attached, the electric power is transferred from the transmission coil of the container body to the reception coil of the main body. Thus, in order for the reception coil of the main body to receive electric power indicating meaningful data, the transmission coil of the main body needs to transfer high electric power to the reception coil of the container body.

Moreover, for connection of the two switches in an upper end portion of the container body and transfer of an electric signal between the upper end portion and a lower end portion of the container body, a connection wire is mounted in such a manner as to connect a circumference edge of the upper end portion of the container body and the upper and lower end portions of the container body.

Therefore, since the connection wire is mounted on the circumference edge of the upper end portion of the container body or is mounted in the upward-downward direction on the flank surface of the container body, an exterior appearance of the container body made of a transparent material may be spoiled. That is, the connection wire for transmitting an electric signal is mounted to a surface of the container body and may be broken off due to interference, or the colored mounting connection wire mounted on the transparent container body may spoil a blender design.

In US Patent Application Publication No.20180020875, the container lid is a single component. Thus, in a case where food or the like is put into the container body, the entire container lid is inconveniently detached. A handle is formed of a single material or is made of the same material as the container body. Thus, a user gets the impression of a crude or coarse image of an upper surface of the main body.

In addition, the container body and the main body are separated and then are brought into contact with each other. Accordingly, a foreign material may be introduced through a gap between the container body and the main body, and thus electric power transfer or signal transmission may not be properly performed.

The container body is frequently detached from the main body for use, and thus components on an upper surface of the main body may be damaged due to introduction of foreign material or physical shock.

SUMMARY

An objective of the present disclosure, which is made to solve the problems in the related art as described above, is to provide a blender including a main body to which a signal indicating detection of attaching of a container lid on a container body is electrically transmitted.

Another objective of the present disclosure is to provide a blender capable of preventing a detection error due to a foreign material, such as water or food, or preventing contamination with the foreign material.

Still another objective of the present disclosure is to provide a blender including a container body in which a component for transmitting a signal or transferring electric power is blocked from contacting with the outside.

Still another objective of the present disclosure is to provide a blender capable of preventing an external foreign material from permeating into a main body or preventing a component from being damaged due to the external foreign material when a container body is attached or detached to and from the main body.

Still another objective of the present disclosure is to provide a blender including a main body and a container body between which a signal is transmitted without a communication traffic jam.

Technical Solution

According to an aspect of the present disclosure, there is provided a blender including a detection system that, with an electric signal, detects whether or not a container lid is mounted.

In the blender, a seating support is formed on an upper surface of a main body in a manner that protrudes upward therefrom to be stepped, a bottom surface of a container body being seated on the seating support. Therefore, the container body that is seated on the main body is prevented from being moved forward, backward, leftward, and rightward. Thus, food is easily chopped into small pieces.

In the blender, one or more components for transferring and receiving electric power or transmitting and receiving a signal between the main body and the container body may be mounted on an upper surface of the main body. The tops of these components are covered by covers, respectively. Therefore, the components are prevented from being damaged or malfunctioning due to an external foreign material.

In the blender, the cover covering the upper surface of the main body may be made of a material capable of transmitting light or a signal. Therefore, a container-lid detection signal generated in the container body is transmitted to the main body without a communication traffic jam.

In the blender, an exterior material may be further provided on an external surface of the seating support formed on the upper surface of the main body. Therefore, in a case where the container body is separated from the main body, a customer gets an aesthetic impression of a stylish image of the upper surface of the main body.

In the blender, an elastic member may be provided on the seating support protruding toward the upper surface of the main body and supporting a bottom surface of the container body. Therefore, a collision between the main body and the container body is prevented. Thus, the blender is prevented from being damaged, and noise is reduced.

In the blender, the seating support may include a lower rim and an upper rim. The lower rim has a diameter corresponding to a diameter of a lower end portion of the container body. The upper rim is formed in such a manner as to protrude upward from the lower rim and has a smaller diameter than the lower rim.

In the blender, a step surface in parallel with the upper surface of the main body may be formed between the lower rim and the upper rim.

In the blender, an elastic member made of an elastic material may be further provided on the step surface.

In the blender, the elastic member may be made of conductivity rubber.

In the blender, an electric power transmission unit configured to supply electric power to the container body and an optical reception module configured to receive light may be mounted on an upper surface of the upper rim.

In the blender, as the optical reception module, an optical sensor receiving light and converting the received light into an electric signal may be used.

In the blender, as the electric power transmission unit, an induction coil where an induced electromotive force is able to occur may be used.

In the blender, the electric power transmission unit and the optical reception module may be mounted on the upper surface of the upper rim in such a manner as to be spaced apart in opposite directions from each other.

In the blender, the electric power transmission unit and the optical reception module may be mounted on one portion of the upper surface of the upper rim in a manner that is in proximity to each other.

In the blender, an exterior ring and an upper end ring may be provided on external surfaces, respectively, of the lower rim and the upper rim. The exterior ring and an upper end ring have shapes corresponding to shapes, respectively, of the external surfaces of the lower rim and the upper rim.

In the blender, the exterior ring and the upper end ring may be made of a stainless steel material. Therefore, an exterior appearance of the upper surface of the main body provides a sense of solidarity and a sense of improved texture.

In the blender, the cover may include a circular cover edge and a plurality of cover portions that are integrally formed with the cover edge and cover a plurality of components, respectively.

In the blender, upper surfaces of the cover portions may be formed in such a manner as to protrude upward above an upper surface of the cover edge.

In the blender, a circular rim protruding downward may be formed on a center portion of the bottom surface of the container body, and a circular-rim accommodation groove may be formed in a center portion of the upper rim in a manner that is cut downward. The circular rim is accommodated in the circular-rim accommodation groove.

In the blender, the circular rim may have the shape of a circular ring and may be open at the center. Thus, the circular rim provides a path through which a blade assembly and a motor assembly are connected to each other.

In the blender, a plurality of mounting protrusions that protrude radially may be further provided on an outer circumferential surface of the circular rim. One or more portions of a protrusion groove may be recessed outward, and thus one or more circular-rim accommodation grooves may be radially formed. The mounting protrusion is seated in the circular-rim accommodation groove. With this configuration, the container body is firmly mounted at its original position on the upper surface of the main body.

Advantageous Effects

A blender according to the present disclosure provides the following effects.

Firstly, according to the present disclosure, with a configuration where an electric circuit formed on a container body is turned on or off according to whether or not a container lid is attached, the container lid is electrically detected. Therefore, there is provided an advantage in that, when compared with mechanical detection in the related art, the container lid is prevented from being damaged due to wear and tear while in use for a long time and in that precise detection is possible.

Secondly, according to the present disclosure, a seating support is formed on an upper surface in a manner that protrudes upward to be stepped, a bottom of the container body is seated on the seating support. Therefore, there is provided an advantage in that, when compared with a case where the seating support is in the same plane as the main body or is a groove, handling of the container body is facilitated.

Thirdly, according to the present disclosure, one or more components for transferring and receiving electric power or transmitting and receiving a signal between the main body and the container body are mounted on the upper surface of the main body. The tops of these components are covered by covers, respectively. Therefore, there is provided an advantage in that the component on the upper surface of the main body is prevented from being damaged or malfunctioning due to an external foreign material in a case where the container body is separated from the main body.

Fourthly, according to the present disclosure, the cover covering the upper surface of the main body is made of a material capable of transmitting light or a signal. Therefore, the effect of transmitting a container-lid detection signal generated in the container body to the main body without a communication traffic jam is achieved.

Fifthly, according to the present disclosure, an exterior material may be further provided on an external surface of the seating support formed on the upper surface of the main body. Therefore, there is provided an advantage in that in a case where the container body is separated from the main body, a user gets an aesthetic impression of a stylish image of the upper surface of the main body.

Sixthly, according to the present disclosure, an elastic member is provided on the seating support protruding toward the upper surface of the main body and supporting a bottom surface of the container body. Therefore, an elastic member having elasticity that is provided between the upper surface of the main body and the container body serves to absorb shock. Thus, there is provided an advantage in that a collision between the container body and the main body is prevented, thereby preventing damage to the blender and noise.

Seventhly, according to the present disclosure, an electric power transmission unit configured to supply electric power to the container body and an optical reception module configured to receive light are mounted on an upper surface of an upper rim of the main body. The electric power transmission unit and optical reception module are mounted on the upper surface of the upper rim in such a manner as to be spaced apart in opposite directions from each other or are mounted on one portion of the upper surface of the upper rim in a manner that is in proximity to each other. Therefore, there is provided an advantage in that a narrow space where the container body and the main body are combined with each other is easily utilized, thereby realizing a compact blender.

Eighthly, according to the present disclosure, a protrusion and a groove are formed on the upper surface of the main body and in a bottom surface of the container body, respectively, in such a manner that shapes of the upper surface and the bottom surface correspond to each other. Therefore, there is provided an advantage in that the container body is precisely mounted at its original position on the man body, thereby preventing rotation and movement thereof.

Ninthly, according to the present disclosure, a cover rib is further formed on the cover covering the upper surface of the main body in a manner that protrudes downward therefrom. The cover is pressed against an edge of an upper end ring. Therefore, there is provided an advantage in that the cover is easily mounted and separated, thereby improving the workability.

DESCRIPTION OF DRAWINGS

FIG. 11 is an exploded perspective view illustrating the detailed configuration of the coil holder assembly that constitutes the blender according to the embodiment of the present disclosure, when viewed from below;

FIG. 15 is an exploded cross-sectional perspective view illustrating the container lid that constitutes the blender according to the embodiment of the present disclosure;

DETAILED DESCRIPTION

A blender according to the present disclosure will be described in detail below with reference to the accompanying drawings.

Figure 1:
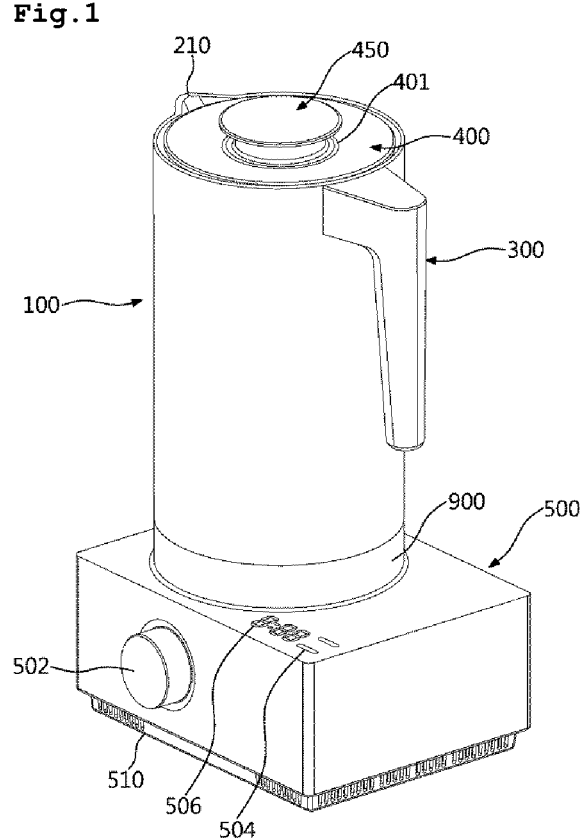
FIG. 1 is a perspective view illustrating a blender according to a desired embodiment of the present disclosure.
Figure 2:
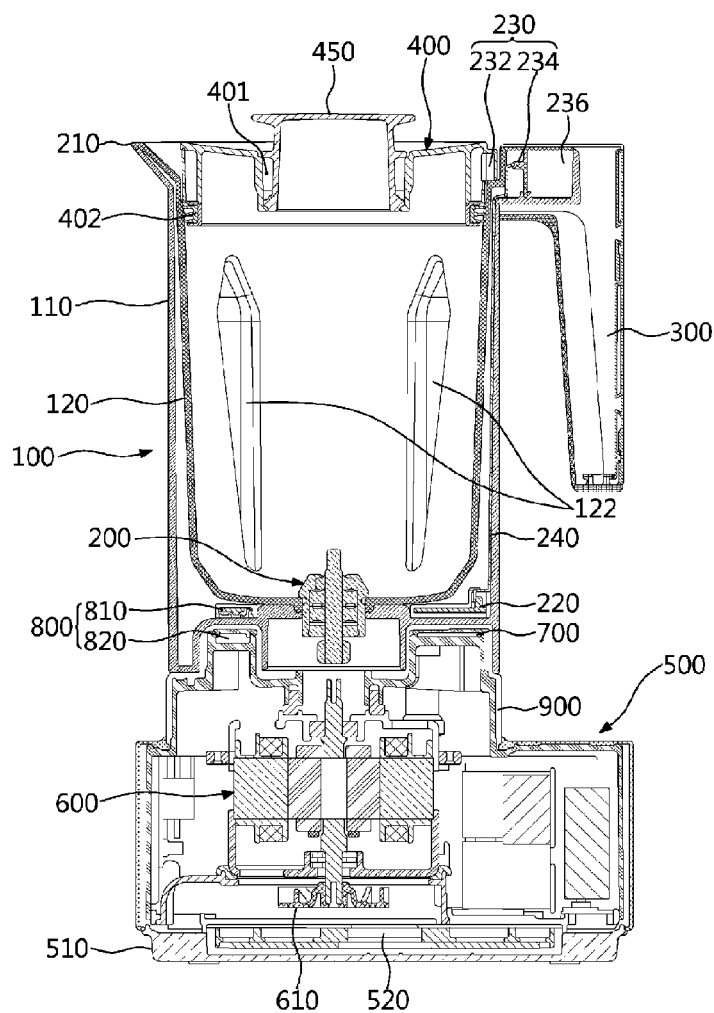
FIG. 2 is a longitudinal cross-sectional view illustrating an internal configuration of the blender according to the embodiment of the present disclosure.

FIG. 1 is a perspective view illustrating a blender according to an embodiment of the present disclosure. FIG. 2 is a longitudinal cross-sectional view illustrating the blender to the embodiment of the present disclosure.

As illustrated in FIGS. 1 and 2, the blender according to the present disclosure is configured to include a container body 100, a main body 500, and the like. The container body 100 is positioned at a relatively great height and accommodates food. The main body 500 is provided underneath the container body 100 and supports the container body 100.

The food is accommodated to the container body 100 and is chopped into pieces or mixed there. The main body 500 supports the container body 100. A plurality of components that control food chopping and mixing in the container body 100, supply electric power, and perform other functions is provided inside the main body 500.

It is desirable that the entire container body 100 has the shape of a cylinder when viewed as a whole. The container body 100 is configured to be open at the top. Thus, the food may be inserted into and taken out of the container body 100.

It is desirable that the container body 100 is made of a transparent material in such a manner that the inside thereof may be viewed from the outside. That is, the container body 100 is made of glass or transparent plastic in such a manner that a user may visually check a state of the food inside the container body 100 from the outside.

A blade assembly 200 is mounted on the inside bottom of the container body 100. A plurality of blades is rotatably mounted in the blade assembly 200 and chops the food accommodated in the container body 100 into small pieces or mix the food.

The blade assembly 200 is configured in such a manner as to be connected to the motor assembly 600 described below and to be rotatable by a rotational force generated by the motor assembly 600.

It is desirable that the wall and the bottom of the container body 100 are formed in a double-layered manner. That is, the container body 100 is configured to include an outer container body 110 that provides an exterior appearance of the container body 100 and an inner container body 120 that is positioned inward from the outer container body 110.

In a case where the outer container body 110 and the inner container body 120 are configured in such a manner as to be brought into contact with each other or in such a manner as to be spaced apart from each other, it is also possible that the outer container body 110 and the inner container body 120 are mounted in such a manner as to be partly brought into contact with each other.

One or more inner guides 122 that have a predetermined length in an upward-downward direction are provided inside the container body 100. The inner guide 122 serves to guide rotating of the food inside the container body 100. It is desirable that the inner guides 122 are symmetrically arranged in each pair in the forward-backward direction or in the leftward-rightward direction.

A handle 300 that is to be gripped with the user's hand is formed on a right-side surface of the container body 100 in a manner that protrudes rightward. It is desirable that the handle 300 is formed in such a manner that the user holds the handle 300 with their hand. According to the present disclosure, an example is illustrated where an upper end portion of the handle 300 is formed integrally with and is configured in such a manner as to be integrally combined with an upper end portion of an external surface of the container body 100.

A projection lip 210 is further formed on the upper portion of the external surface of the container body 100 in a manner that is opposite to the handle 300.

The projection lip 210, as illustrated, is formed on an upper end portion of the left side of the container body 100 and serves to guide discharging of the small pieces of the food inside the container body 100 in an easy manner to the outside. Therefore, it is desirable that the projection lip 210 is formed in such a manner that the nearer an upper end of the projection lip 210 is to the upper surface of the container body 100, the more the upper end thereof protrudes in the leftward direction.

The top of the container body 100 is covered by a container lid 400. That is, the container lid 400 is detachably mounted on the upper surface of the container body 100, and thus closes or opens the top of the container body 100.

The container lid 400 covers the top of the container body 100 in such a manner that the food does not get out of the container body 100 to the outside, and blocks an outside foreign material from being introduced into the container body 100.

The container lid 400 is configured in such a manner as to be attached on the upper surface of the container body 100 by the user pressing or rotating the container lid 400. A gasket 402 is further provided on an outer circumferential surface of the container lid 400 and bridges a gap between the container lid 400 and the container body 100. Of course, the gasket 402 also serves to press the container lid 400 against the upper surface of the container body 100, and thus hold the container lid 400 firmly in place.

A cap 450 is further provided on the container lid 400. That is, a cover hole 401 that is a circular hole of a predetermined size is formed in a center portion of the container lid 400 in a manner that passes through the center portion thereof from top to bottom. The cap 450 is inserted into the cover hole 401 and plugs the cover hole 401.

The cap 450, as illustrated, is mounted on the center portion of the container lid 400. The cap 450 is formed in such a manner as to have a smaller diameter than the container lid 400 when viewed as a whole. It is desirable that the cap 450 is detachably mounted on the container lid 400 by forcefully inserting the cap 450 thereinto or by rotating the cap 450.

According to the present disclosure, an example is illustrated where the cap 450 is detachably mounted on the container lid 400 by rotating the cap 450. A detailed configuration of the cap 450 is described as follows.

The cap 450 is detachably mounted on the container lid 400. Thus, the user may observe the food inside the container body 100 without the need to detach the container lid 400 in a state where only the cap 450 is detached from the container lid 400. After the cap 450 is detached, it is also possible that the food is inserted into the container body 100 or that the food inside the container body 100 is mixed using a rod or the like.

An upper end portion of the cap 450 is formed in such a manner as to protrude more upward than an upper end portion of the container lid 400. Thus, the upper end portion thereof may also serve as a container lid handle that is to be gripped by the user's hand when attaching or detaching the container lid 400.

As illustrated, the main body 500 is formed in such a manner as to have the shape of a parallelepiped when viewed as a whole. The main body 500 is provided underneath the container body 100 and supports the container body 100. A plurality of components including electronic components, such as the motor assembly 600 and a printed circuit board (PCB), is mounted inside the main body 500. Of course, the main body 500 may have an exterior appearance that can vary widely whenever necessary.

The motor assembly 600 is positioned inside a center portion of the main body 500. The motor assembly 600 is supplied with electric power from the outside, and thus generates a rotational force. The blades constituting the blade assembly 200 are rotated by the generated rotational force.

Therefore, it is desirable that a lower end of the blade assembly 200 is connected to an upper end portion of the motor assembly 600.

A knob 502 is formed on a front surface of the main body 500 in a manner that protrudes forward. The knob 502 serves to set the blender according to the present disclosure in operation. It is desirable that the knob 502 is rotatably mounted on the main body 500.

The knob 502 may also be configured in such a manner as to control a rotational speed of the motor assembly 600. That is, the knob 502 may be configured in such a manner that clockwise or counterclockwise rotation thereof changes the rotational speed of the motor assembly 600 from high to low or from low to high.

A touch operation unit 504 is provided on an upper surface of the main body 500.

The touch operation unit 504 serves to operate the blender according to the present disclosure via contact. It is desirable that the touch operation unit 504 is configured in such a manner as to perform operations, such as starting the blender and stopping the blender.

Of course, the knob 502 and the touch operation unit 504 may be configured in such a manner as to selectively perform a function of setting the blender and a function of operating the blender or in such a manner as to perform these two functions individually. That is, for convenience, according to the user's selection, one of the knob 502 and the touch operation unit 504 may be configured in such a manner as to perform the function of operating the blender or the function of setting the blender.

A display unit 506 is further provided adjacent to the touch operation unit 504 (to the left side of the touch operation unit 504 in FIG. 1). That is, the display unit 506 is further provided on the upper surface of the main body 500. The display unit 506 serves to display an operating state of the blender in such a manner as to be viewed by the user from the outside. Therefore, it is desirable that the display unit 506 is configured as a seven-segment display.

A cooling fan 610 is further provided below the motor assembly 600.

The cooling fan 610 is connected to a lower end portion of the motor assembly 600, and thus is rotated by the rotational force generated by the motor assembly 600.

Accordingly, outside air is forced to be introduced into the main body 500. In this manner, the cooling fan 610 introduces the air into the main body 500 from the outside. Thus, the cooling fan 610 serves to cool components, such as a PCB, that are provided inside the main body 500.

A base support 510 is further provided on a lower surface of the main body 500.

The base support 510 is formed in such a manner as to protrude downward from a bottom surface of the main body 500. A space of a predetermined size is formed inside the base support 510. A wireless electric power module 520 is accommodated in this space. The wireless electric power module 520 is supplied with electric power from the outside in a wireless manner that uses an induced electromotive force and serves to supply the electric power to the motor assembly 600 inside the main body 500.

A detection system is further provided in the main body 500, the container body 100, and the like. The detection system detects whether or not the container lid 400 is attached on the upper surface of the container body 100. A detection system is further provided in the main body 500 or the container body 100. The detection system detects whether or not the container lid 400 is attached on the upper surface of the container body 100.

The detection system may be provided in at least one of the main body 500 and the container body 100. That is, it is possible that the detection system is provided in a manner that corresponds to the main body 500 and the container body 100 or that the detection is provided in only one of the main boy 500 and the container body 100.

An electric circuit (not illustrated) capable of being turned on and off is provided on the container body 100. The electric circuit forms a closed circuit. Thus, it is desirable that the detection system is configured in such a manner as to detect whether electric current flows through the closed circuit by a voltage supplied from the main body 500.

More specifically, the detection system is configured to include an electric power transmission unit 700, an electric power reception unit 220, an opening and closing unit 230, a transparent electrode film 240, a detection unit 800, and the like. The electric power transmission unit 700 is provided in the main body 500 and supplies electric power to the container body 100. The electric power reception unit 220 is provided in the container body 100 and receives the electric power supplied from the electric power transmission unit 700. The opening and closing unit 230 is provided on an upper end portion of the container body 100 and opens and closes an electric circuit formed in the container body 100 according to whether or not the lid 400 covers the top of the container body 100. The transparent electrode film 240 is made of a transparent material and is provided on one surface of the container body 100. The transparent electrode film 240 is connected to the electric power reception unit 220 and the opening and closing unit 230 in a manner that allows electricity to flow therebetween. The detection unit 800 is provided on one side of the main body 500 or the container body 100 and detects whether or not electric current flows through a closed circuit formed by the electric circuit connected to the electric power reception unit 220 and the opening and closing unit 230.

The electric power transmission unit 700 serves to transfer the electric power supplied to the main body 500 from the outside of the main body 500 or the electric power pre-stored in the main body 500 itself to the container body 100. It is desirable that an induction coil or the like where an induced electromotive force can occur is used as the electric power transmission unit 700.

The electric power reception unit 220 serves to receive the electric power transmitted from the main body 500 and has a structure corresponding to that of the electric power transmission unit 700. That is, it is desirable that the electric power reception unit 220 is configured as a coil in such a manner that, by the induced electromotive force, the electric power is transferred between the electric power transmission unit 700 and the electric power reception unit 220.

It is desirable that the electric power transmission unit 700 and the electric power reception unit 220 are positioned adjacent to each other in such a manner as to generate the induced electromotive force. Therefore, according to the present disclosure, a case is illustrated where the electric power transmission unit 700 is mounted on an upper right end portion of the container body 100 and where the electric power reception unit 220 is mounted on a lower right end portion of the container body 100.

The turning-on and -off unit 230 serves to turn on and turn off the electric circuit (not illustrated) formed in the container body 100 according to whether or not the container lid 400 covers the top of the container body 100. The turning-on and -off unit 230 is configured to include a permanent magnet 232, and a reed switch 234 that are provided in the container lid 400 and the container body 100, respectively, and the like.

As illustrated in FIG. 2, according to the present disclosure, a case is illustrated where the permanent magnet 232 is mounted on a right edge of the container lid 400 and where the reed switch 234 is mounted on the upper end portion (a portion of the handle 300) of the container body 100.

More specifically, it is desirable that the reed switch 234 is mounted in such a manner as to be accommodated in a switch groove 236 formed in the upper end portion of the handle 300.

The reed switch consists of a pair of ferromagnetic flexible metal contacts in a hermetically sealed glass envelope. The contacts are open when a magnetic field is applied. The configuration of the reed switch is well known in the related art. Therefore, a further detailed description of the configuration and principle of the reed switch is omitted.

Of course, instead of the permanent magnet 232 and the reed switch 234, it is also possible that a different electric turning-on and -off unit or a mechanical structure is used, as the turning-on and -off unit 230, to turn on and off the electric circuit. It is also possible that the permanent magnet 232 and the reed switch 234 are mounted on the container lid 400 and the container body 100, respectively.

Various types of electric devices, various types of structures, or the like, if they have a function of being able to detect whether or not electric current flows by the turning-on and -off unit 230 through the electric circuit formed in the container body 100, may be used as the detection unit 800. According to the present disclosure, the detection unit 800 is described by taking, as an example, detection of light that uses a photosensor or photodetector.

Therefore the detection unit 800 is configured to include an optical transmission module 810, an optical reception module 820, and the like. The optical transmission module 810 is provided in the container body 100 and generates light. The optical reception module 820 is provided in the main body 500 and receives the light transmitted by the optical transmission module 810.

It is desirable that the optical transmission module 810 and the optical reception module 820 are positioned adjacent to each other. According to the present disclosure, as illustrated, the optical transmission module 810 is positioned on a lower left end portion of the container body 100, and the optical reception module 820 is positioned on an upper left end portion of the main body 500.

It is desirable that a light emitting diode (LED) or the like that generates light using electricity is used as the optical transmission module 810. It is desirable that a photosensor, a photodetector, or the like that receives light and converts the received light into an electric signal is used as the optical reception module 820.

Then, the transparent electrode film 240 is provided between the outer container body 110 and the inner container body 120. More specifically, it is desirable that the transparent electrode film 240 is mounted on an internal surface of the outer container body 110.

The transparent electrode film 240, as a conductive member, is made of a transparent material, such as indium-tin oxide (ITO), and is attached on a surface of the container body 100. The turning-on and -off unit 230 provided on the upper end portion of the container body 100 is also connected to the electric power reception unit 220 and the optical transmission module 810, which are provided on a lower end portion of the container body 100, thereby constituting the electric circuit.

In this manner, the transparent electrode film 240 is attached on the surface of the container body 100 made of a transparent material in a manner that extends longitudinally in the upward-downward direction. Thus, the transparent electrode film 240 serves to guide transfer of an electric signal between upper and lower end portions of the container body 100.

When the container body 100 and the transparent electrode film 240 are both made of a transparent material, the transparent electrode film 240 is not visually exposed to the outside. Thus, the transparent electrode film 240 does not spoil the exterior appearance of the container body 100, and a design of the container body 100 is maintained as is.

Then, in a case where the transparent electrode film 240 is attached on the surface of the container body 100, a hole may be formed in the transparent electrode film 240. The hole serves to remove a bubble occurring between the transparent electrode film 240 and the surface of the container body 100 on which the transparent electrode film 240 is attached. That is, in order to prevent the bubble from occurring, it is desirable that a hole is drilled through a center portion of the transparent electrode film 240 made of ITO in such a manner that the bubble escapes therethrough.

A seating support 900 is formed on the upper surface of the main body 500 in such a manner as to protrude upward therefrom.

The seating support 900 is formed to a circular shape that corresponds to a shape of the lower end portion of the container body 100. The lower end portion of the container body 100 is seated in the upward-downward direction on the seating support 900 in a manner that is removable therefrom.

The container body 100 is formed in a double-layered layer. That is, the container body 100 is configured to include the outer container body 110 and the inner container body 120. It is desirable that the inner guide 122 is formed in such a manner as to protrude inward from an internal surface of the inner container body 120.

A configuration of the container body 100 will be described in detail below.

Figure 3:
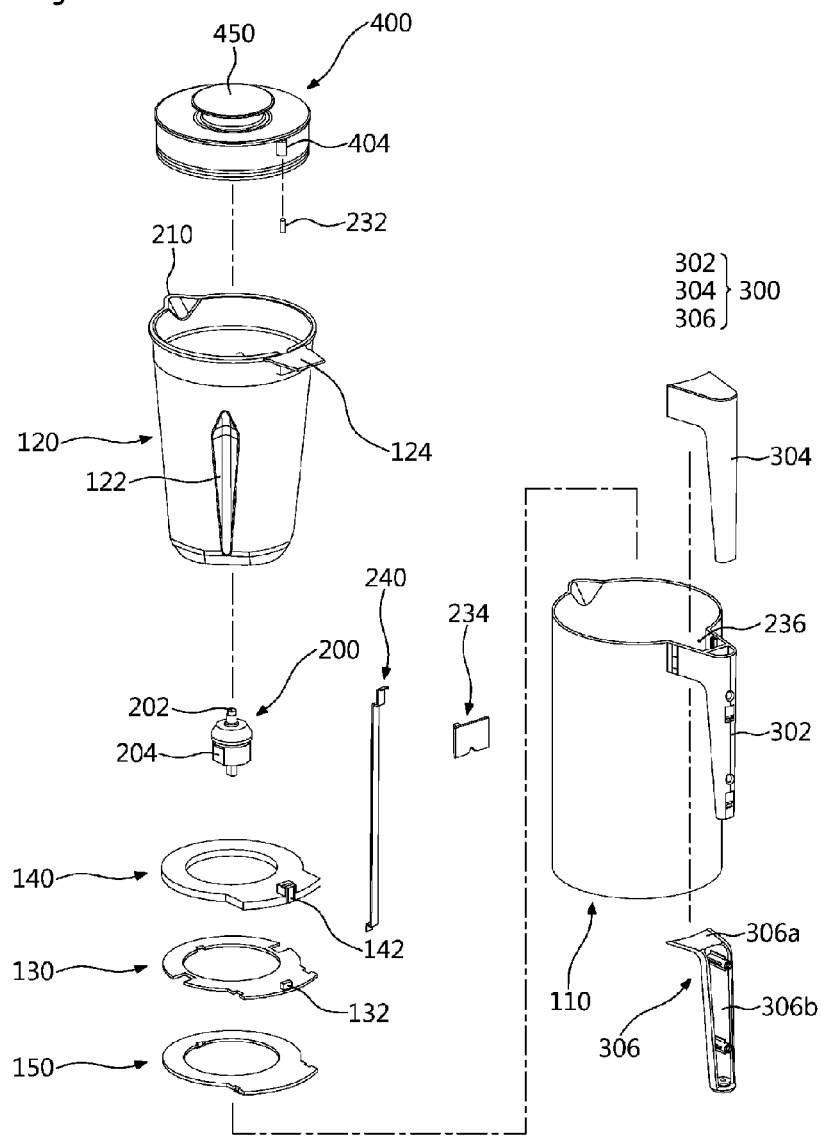
FIG. 3 is an exploded perspective view illustrating a detailed configuration of a container body that constitutes the blender according to an embodiment of the present disclosure.
Figure 4:
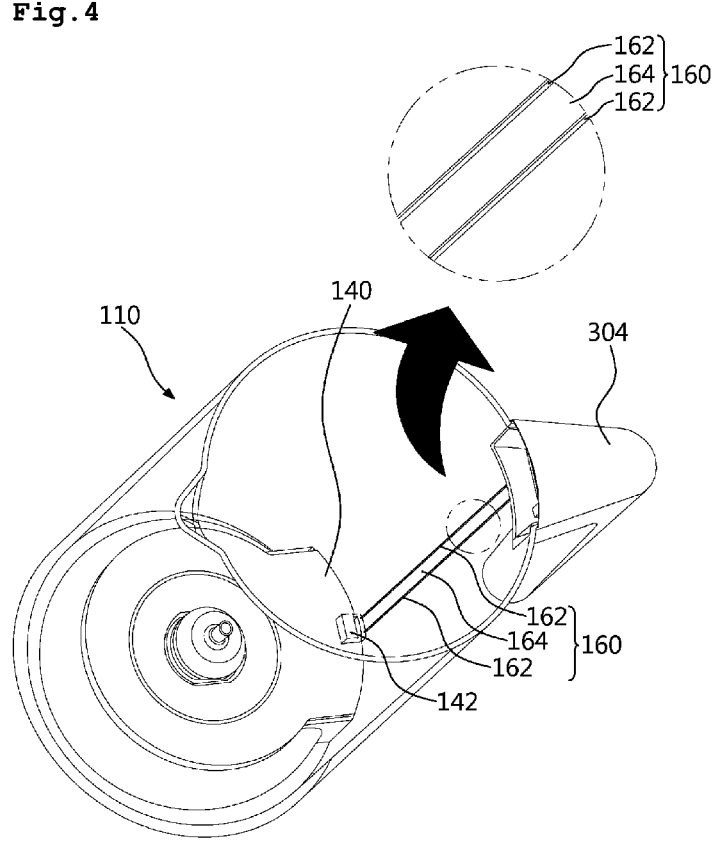
FIG. 4 is a perspective view illustrating a configuration of an outer container body that constitutes the blender according to an embodiment of the present disclosure.
Figure 5:
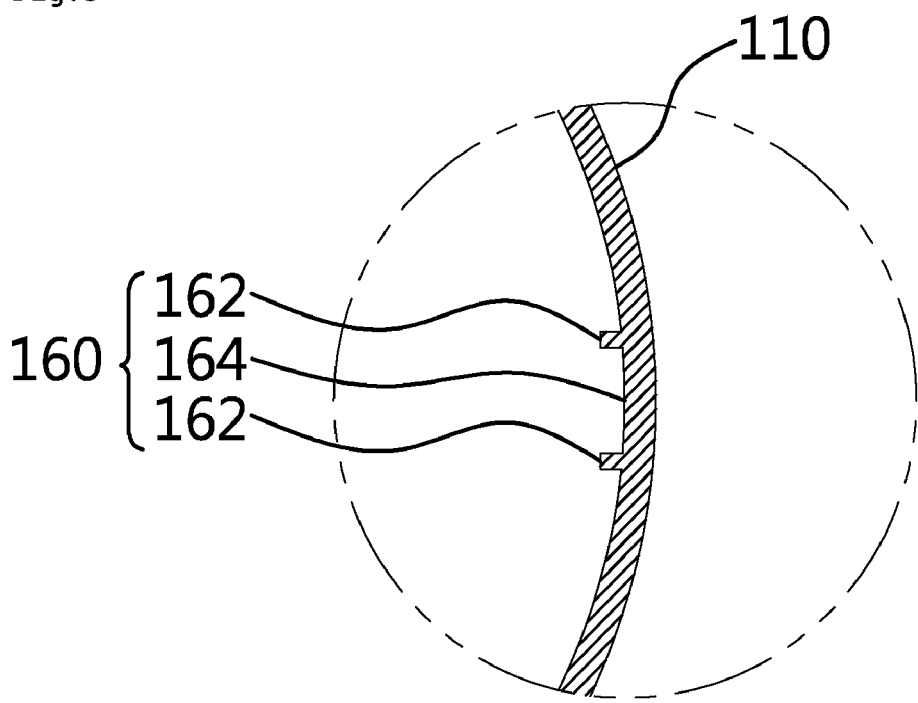
FIG. 5 is a partial cross-sectional view illustrating a detailed configuration of a film guide on the outer container body that constitutes the blender according to the embodiment of the present disclosure.

FIGS. 3 to 15 are views each illustrating in detail a configuration of each of the container body 100 and the container lid 400. That is, FIG. 3 is an exploded perspective view illustrating the container body 100. FIG. 4 is a perspective view illustrating a configuration of an outer container body 110 that constitutes the blender according to an embodiment of the present disclosure. FIG. 5 is a partial cross-sectional view illustrating a detailed configuration of a film guide on the outer container body 110 that constitutes the blender according to the embodiment of the present disclosure.

Figure 6:
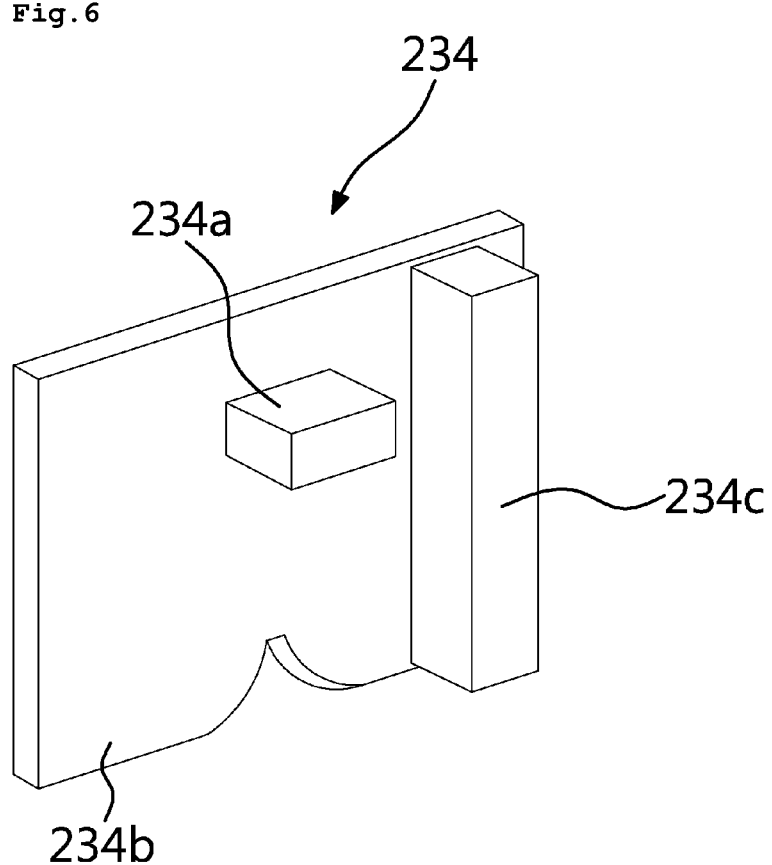
FIG. 6 is a perspective view illustrating a detailed configuration of a reed switch that constitutes the blender according to an embodiment of the present disclosure.
Figure 7:
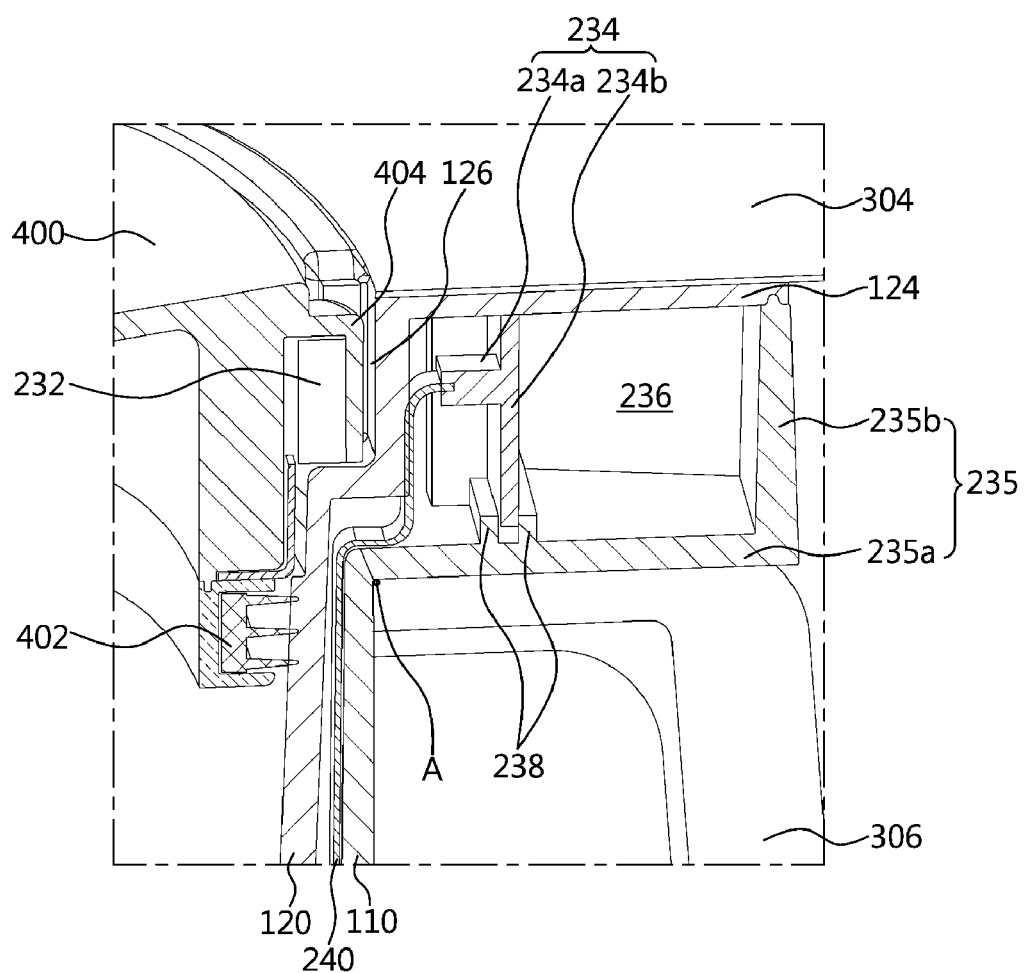
FIG. 7 is a partial cross-sectional view illustrating a state where the reed switch that constitutes the blender according to the embodiment of the present disclosure is mounted.
Figure 8:
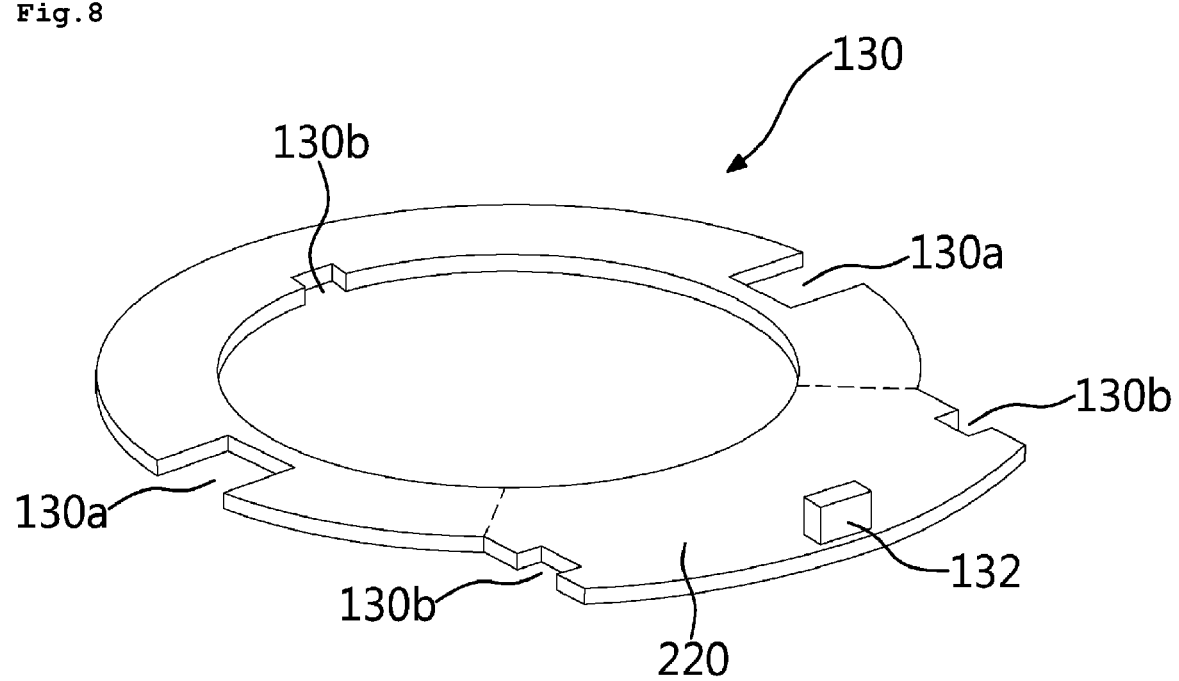
FIG. 8 is a perspective view illustrating a configuration of a coil holder that constitutes the blender according to an embodiment of the present disclosure, when viewed from above.
Figure 9:
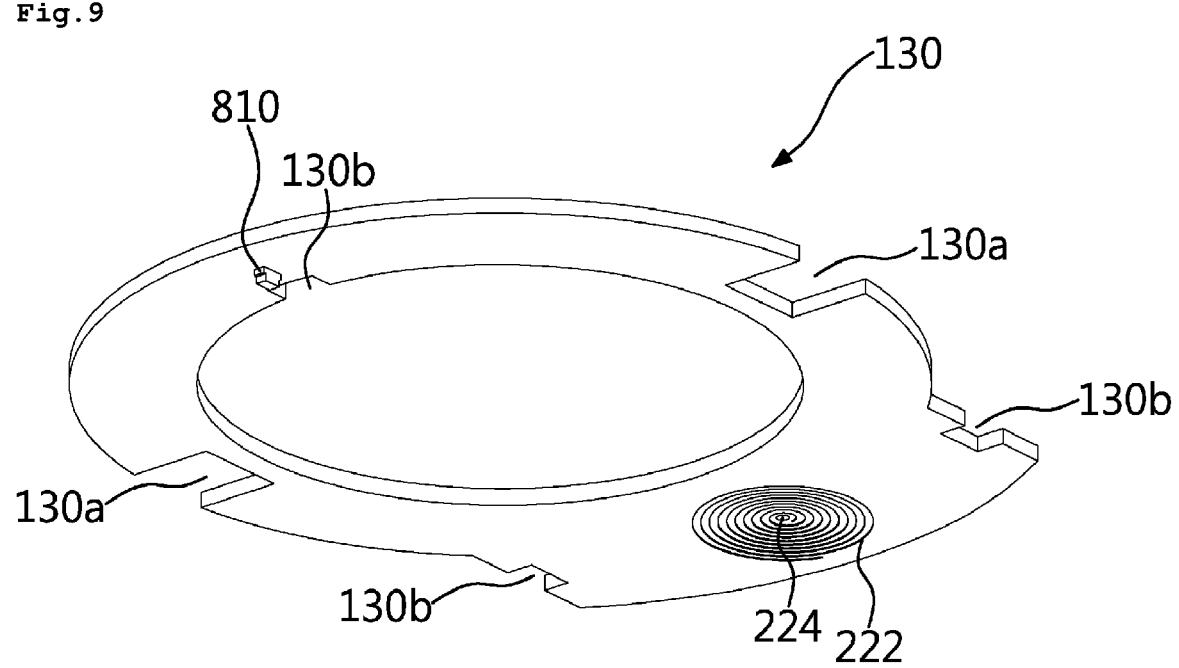
FIG. 9 is a perspective view illustrating the configuration of the coil holder that constitutes the blender according to the embodiment of the present disclosure, when viewed from below.

FIG. 6 is a perspective view illustrating a detailed configuration of a reed switch 234 that constitutes the blender according to an embodiment of the present disclosure. FIG. 7 is a partial cross-sectional view illustrating a state where the reed switch 234 is mounted. FIG. 8 is a perspective view illustrating a configuration of a coil holder 130 when viewed from above. FIG. 9 is a perspective view illustrating a configuration of the coil holder 130 when viewed from below.

Figure 10:
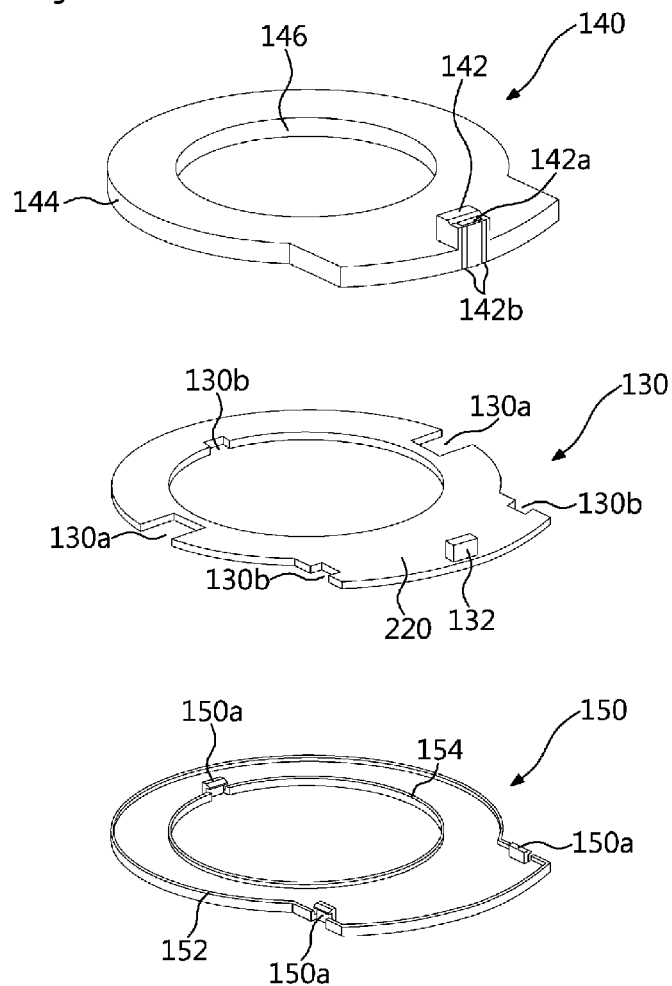
FIG. 10 is an exploded perspective view illustrating a detailed configuration of a coil holder assembly that constitutes the blender according to the embodiment of the present disclosure, when viewed from above.
Figure 12:
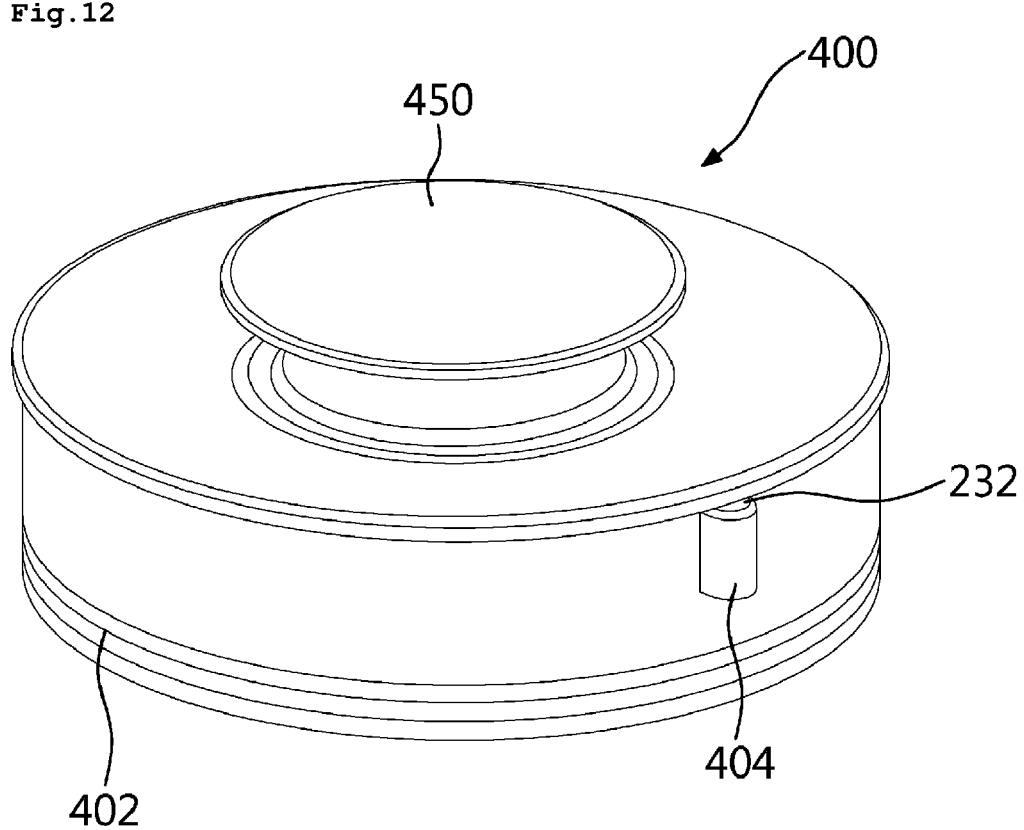
FIG. 12 is a perspective view illustrating a container lid that constitutes the blender according to an embodiment of the present disclosure.
Figure 13:
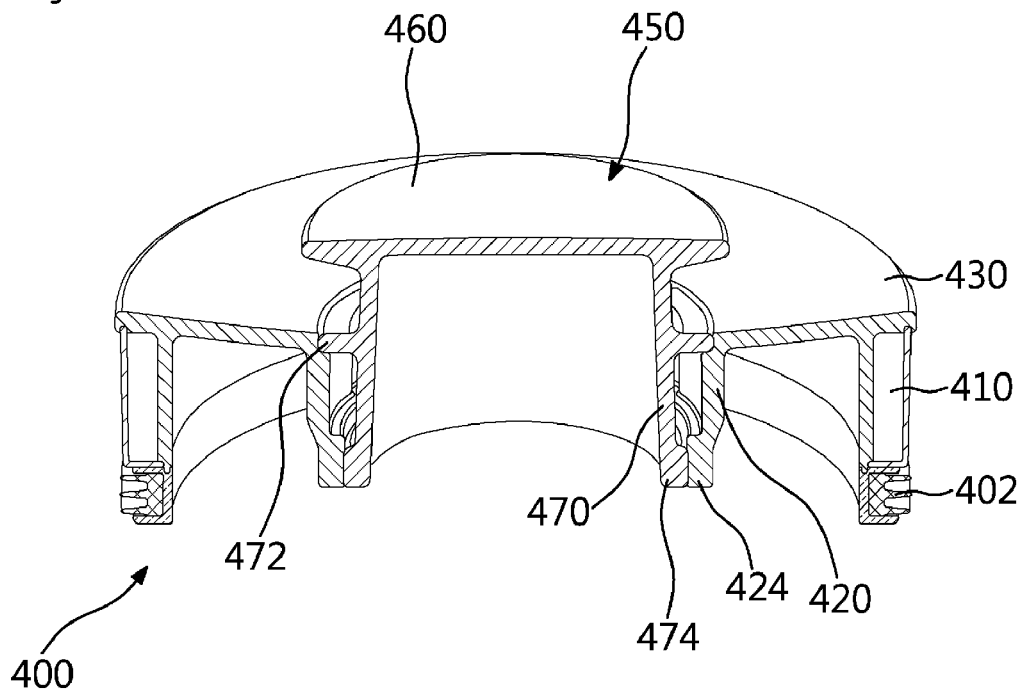
FIG. 13 is a cross-sectional perspective view illustrating the container lid that constitutes the blender according to the embodiment of the present disclosure.
Figure 14:
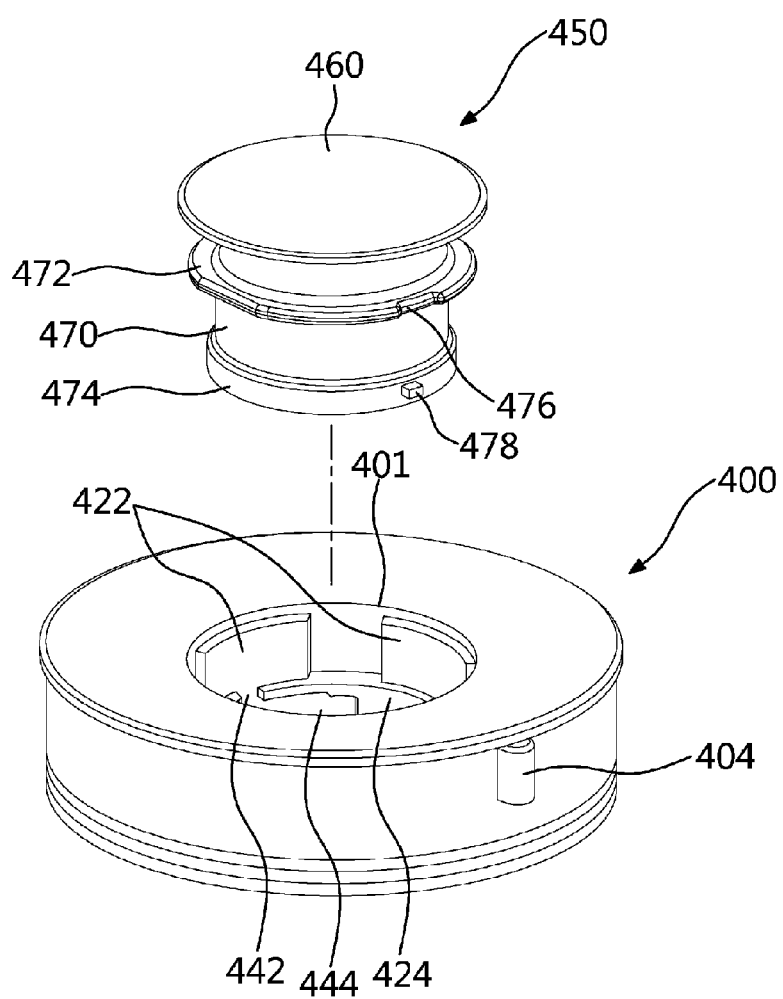
FIG. 14 is an exploded perspective view illustrating the container lid that constitutes the blender according to the embodiment of the present disclosure.
Figure 16:
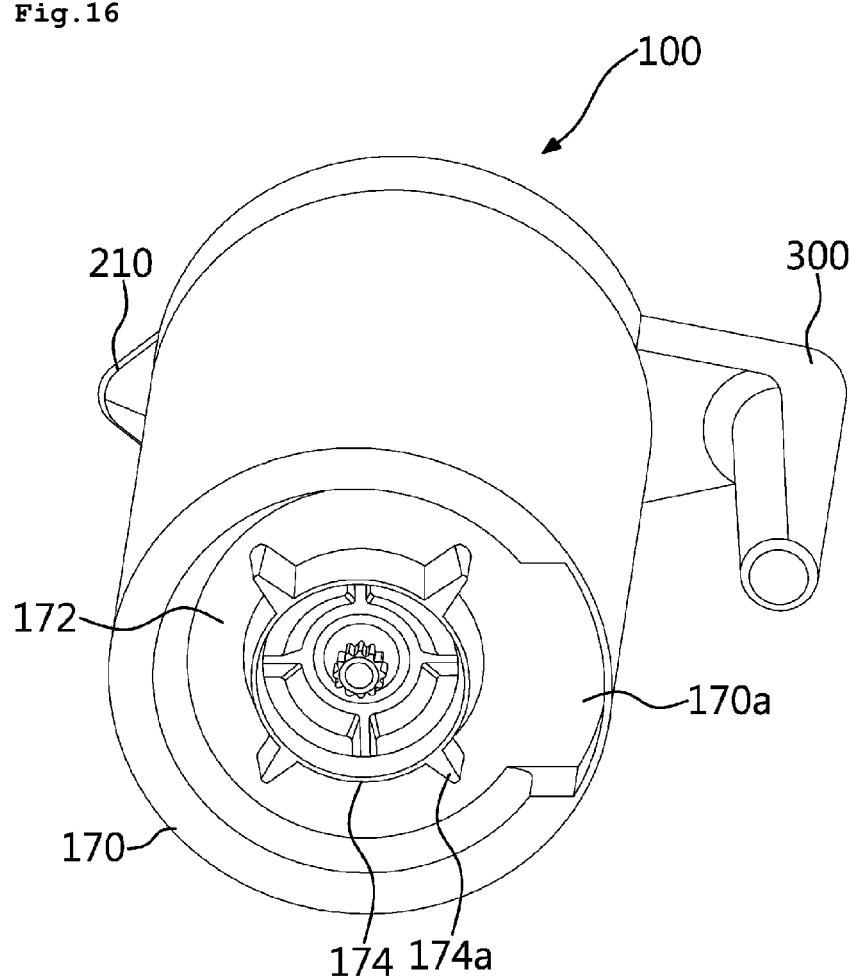
FIG. 16 is a perspective view illustrating a container body that constitutes the blender according to an embodiment of the present disclosure, when viewed from below.

FIG. 10 is an exploded perspective view illustrating a detailed configuration of a coil holder assembly that constitutes the blender according to an embodiment of the present disclosure, when viewed from above. FIG. 11 is an exploded perspective view illustrating the detailed configuration of the coil holder assembly that constitutes the blender according to the embodiment of the present disclosure, when viewed from below. FIG. 12 is a perspective view illustrating a container lid 400. FIG. 13 is a cross-sectional perspective view illustrating the container lid 400. FIG. 14 is an exploded perspective view illustrating the container lid 400. FIG. 15 is an exploded cross-sectional perspective view illustrating the container lid 400. FIG. 16 is a perspective view illustrating a container body 100 when viewed from below.

As illustrated in these figures, the container body 100 is formed to a cylindrical shape when viewed as a whole and is formed in a double-layered manner. That is, the container body 100 is configured to include the outer container body 110 that provides the exterior appearance of the container body 100 and the inner container body 120 that is positioned inward from the outer container body 110.

It is desirable that the container body 100, that is, the outer container body 110 and the inner container body 120 are made of a transparent material. That is, it is desirable that the outer container body 110 and the inner container body 120 are made of a transparent material, such as glass, polycyclohexylenedimethylene terephthalate (PCT), or transparent plastic in such a manner that the user may visually check the state of the food inside the container body 100 from the outside.

The outer container body 110 provides the exterior appearance of the container body 100. It is desirable that the external container body 110 is formed to a cylindrical shape that has upper and lower portions of the same size. A main handle 302 is formed in such a manner as to protrude rightward from a right-side external surface of the outer container body 110. The main handle is to be gripped with the user's hand.

The main handle 302 is formed to the shape of a symbol "¬". An upper end portion of the main handle 302 is connected to an upper right end portion of the outer container body 110. It is desirable that the main handle 302 is formed by injection molding in such a manner as to be integrally combined with the outer container body 110. In this manner, the main handle 302 has relatively more improved strength and durability in terms of an advantage when formed by injection molding in such a manner as to be integrally combined with the outer container body 110 than when jointed or fixed, as a separate single component, to the outer container body 110.

A mounting support 235 that has a predetermined space inside is formed on a portion of the main handle 302 that is connected to the container body 100. The reed switch 234 is mounted in the mounting support 235.

The switch groove 236 in which the reed switch 234 is accommodated is formed inside the mounting support 235. That is, the switch groove 236 is formed in the upper end portion of the main handle 302 and provides a space in which the reed switch 234 is mounted. The switch groove 236 is open at the left side.

More specifically, the mounting support 235 is configured to include a bottom plate 235a, a sidewall 235b, and the like. The bottom plate 235a extends sideways from flank surface of the outer container body 110 in a manner that is vertical thereto. The sidewall 235b extends upward from a right end portion of the bottom plate 235a in a manner that is vertical thereto.

Therefore, the switch groove 236 of a predetermined size is formed over the bottom plate 235a. The switch groove 236 is closed with a covering container lid 124 at the top. The covering container lid 124 extends sideways from an upper end portion of the inner container body 120. The switch groove 236 is open at the left side, and the transparent electrode film 240 is inserted into the switch groove 236.

A pair of mounting ribs 238 that are spaced apart a predetermined distance are formed on the bottom plate 235a in a manner that protrudes upward therefrom to have a predetermined height. The reed switch 234 is fixedly mounted between the pair of mounting ribs 238.

More specifically, the reed switch 234 is configured to include a switch portion 234a, a support piece 234b, and the like. A switch is provided in the switch portion 234a.

As illustrated, the support piece 234b is formed as a flat plate having a predetermined thickness and is mounted on the switch groove 236 in the upward-downward direction, thereby fixedly supporting the switch portion 234a. That is, a lower end portion of the support piece 234b is fixedly inserted between the pair of mounting ribs 238. Therefore, it is desirable that a thickness of the lower end portion of the support piece 234b is formed in such a manner as to have a size corresponding to a gap between the pair of mounting ribs 238.

It is more desirable that the lower end portion of the support piece 234b is forcefully inserted between the gap between the pair of mounting ribs 238 for being mounted therebetween.

As illustrated, the switch portion 234a is mounted on the support piece 234b in a manner that protrudes leftward therefrom. An upper end portion of the transparent electrode film 240 is connected to a left end portion of the switch portion 234a.

A support protrusion 234c may be further formed on one end portion of the support piece 234b. As illustrated, the support protrusion 234c is formed on a left end portion or a right end portion of the support piece 234b in a manner that protrudes therefrom to have a predetermined height. Thus, the reed switch 234 is easily mounted on the mounting support 235, the covering container lid 124 of the inner container body 120, or the like.

An exterior handle 304 and an internal handle 306 are further provided in such a manner as to extend outward from the main handle 302. That is, as illustrated, the exterior handle 304 is provided to the right side of the main handle 302, and the internal handle 306 is provided to the left side thereof.

More specifically, like the main handle 302, the exterior handle 304 is also formed to the shape of the symbol "¬" when viewed as a whole. The exterior handle 304 is formed in such a manner as to enclose an upper surface, a right-side surface, and front and rear surfaces of the main handle 302. It is desirable that the exterior handle 304 is made of a less-unbreakable antirust material having a smooth surface, such as a stainless steel material. This formation of the exterior handle 304 provides a visually aesthetic impression to a consumer.

The internal handle 306 encloses a left-side surface and a bottom surface of the main handle 302. The internal handle 306 is formed to the shape of the symbol "¬" that corresponds to a shape of the bottom surface of the main handle 302. It is desirable that at least one portion of the internal handle 306 is made of an elastic material.

Specifically, the internal handle 306 is configured to include a connection portion 306a, a grip portion 306b, and the like. The connection portion 306a encloses a lower part of the upper end portion of the main handle 302. The grip portion 306b is formed in such a manner as to extend downward from the connection portion 306a and encloses the left-side surface of the main handle 302.

It is desirable that, like the external handle 304, the connection portion 306*a* is made of a less-breakable material having a smooth surface. The grip portion 306*b* is covered by the user's fingers. Thus, it is desirable that the grip portion 306*b* is made of an elastic material. That is, it is desirable that the connection portion 306*a* is made of a stainless material. The grip portion 306*b* is covered by the user's four fingers (other than the thumb). Thus, it is desirable that grip portion 306*b* is made of an elastic material, such as rubber, that provides a sense of smooth touch to the user.

The inner container body 120 is formed in such a manner as to have a smaller size (diameter) than the outer container body 110 and is seated inside the outer container body 110.

The inner container body 120 is formed to a cylindrical shape that is open at the top. More specifically, as illustrated, the nearer a cross section of the inner container body 120 is to the bottom, the more decreased a diameter thereof. That is, the inner container body 120 is formed in such a manner as to be tapered to the bottom.

A plurality of inner guides 122 as described above is formed in the upward-downward direction in an external surface of the inner container body 120. The blade assembly 200 and the like are mounted on a lower end portion of the inner container body 120.

The projection lip 210 is formed on an upper left end portion of the inner container body 120 in a manner that protrudes leftward. A covering container lid 124 is formed on an upper right end portion of the inner container body 120 in a manner that extends rightward.

The covering container lid 124 serves to cover the top of the switch groove 236 in the outer container body 110. The covering container lid 124 is formed to a plate that has a predetermined thickness. In order to correspond to a size of an upper end portion of the switch groove 236, the covering container lid 124 is formed in such a manner that the more a right end thereof protrudes rightward, the smaller a width thereof.

The blade assembly 200 is mounted on the lower end portion of the inner container body 120.

The blade assembly 200 chops food into small pieces or mix the food using a blade. The blade assembly 200 is configured to include a blade shaft 202, a blade body 204, one or more blades, and the like. The blade shaft 202 is supplied with the rotational force from the motor assembly 600, and thus is rotated. The blade body 204 is provided around the blade shaft 202 and supports the blade shaft 202. The one or more blades are connected to the blade shaft 202 to be rotated and chop the food into small pieces.

The coil holder assembly is further provided between the outer container body 110 and the inner container body 120.

The coil holder assembly is configured to include a coil holder 130, an upper cover 140, a lower cover 150, and the like. An induction coil is provided on the coil holder 130. The upper cover 140 and the lower cover 150 enclose upper and lower portions, respectively, of the coil holder 130.

Specifically, the coil holder 130 is provided between a bottom surface of the outer container body 110 and a bottom surface of the inner container body 120. The electric power reception unit 220 and the optical transmission module 810 are mounted on the coil holder 130.

The coil holder 130 has the shape of a circular ring of a predetermined width when viewed as a whole. The electric power reception unit 220 is provided on a right end portion of the coil holder 130 in the shape of the circular ring. That is, although not illustrated in detail, the induction coil receiving electric power is provided on the right end portion of the coil holder 130 and constitutes the electric power reception unit 220.

The electric power reception unit 220 provided on the coil holder 130 may be realized as a reception induction coil 222 patterned in the same plane on a PCB. That is, as illustrated (refer to FIG. 9), in an implementation example of the electric power reception unit 220, the reception induction coil 222 is wound a number of times in helical form on a reception core 224 on the PCB on the bottom surface of the coil holder 130.

The optical transmission module 810 is provided on the bottom surface of the coil holder 130.

The optical transmission module 810 emits light by electricity supplied from the electric power reception unit 220 and constitutes the detection unit 800. As described above, it is desirable that an LED or the like is used as the optical transmission module 810.

The electric power reception unit 220 and the optical transmission module 810 are electrically connected to each other. That is, the electric power reception unit 220 and the optical transmission module 810 are formed in such a manner as to form a closed circuit along with the turning-on and -off unit 230 and the like. Therefore, it is desirable that the electric power reception unit 220, the optical transmission module 810, the turning-on and -off unit 230, and the like are configured in such a manner as to be electrically connected to each other by a printed circuit board or the like on the coil holder 130.

As illustrated, the electric power reception unit 220 and the optical transmission module 810 are mounted on a left end portion and a right end portion, respectively, of the coil holder 130 in such a manner to be spaced apart from each other and are configured in such a manner as to be electrically connected to each other by a printed circuit board or the like. In addition, it is also possible that the electric power reception unit 220 and the optical transmission module 810 are both mounted on one of the left end portion and the right end portion of the coil holder 130, and thus are configured in such a manner as to be in proximity to each other.

Although not illustrated, a conversion module that converts alternating current (AC) into direct current (DC) may be further provided on the coil holder 130.

A holder terminal 132 is provided on an upper surface of a right end portion of the coil holder 130.

A lower end portion of the transparent electrode film 240 is inserted into the holder terminal 132 for being connected thereto.

As illustrated, the coil holder 130 is formed to the shape of a ring when viewed as a whole. As illustrated, it is desirable that the coil holder 130 is formed in such a manner that the right end portion thereof has a relatively wide so that the electric power reception unit 220 and the like are formed on the right end portion thereof.

In this manner, when the coil holder 130 is formed to the shape of a ring, a hole is formed in a center portion of the coil holder 130 in a manner that passes through the center portion thereof. This hole provides a path through the blade assembly 200 and the motor assembly 600 can be connected to each other. That is, it is possible that the rotational force generated by the motor assembly 600 is transferred to the blade assembly 200 without interfering with the coil holder 130.

A plurality of grooves is formed in an inner circumferential surface and an outer circumferential surface of the coil holder 130. More specifically, a fixation groove 130*a* is formed in each of the front and rear end portions of the coil holder 130 in a manner that is cut inward. A hook through-hole 130b is formed in each of the front and rear sides of the right end portion of the coil holder 130 and is formed in the inner side of the left end portion thereof.

A fixation guidance piece 148 described below is accommodated in the fixation groove 130a in a manner that passes therethrough. An upper or lower hook 140a or 150a described below is accommodated in the hook through-hole 130b or passes therethrough.

The coil holder 130 is protected by the upper and lower covers 140 and 150. The upper cover 140 and the lower cover 150 that correspond to upper and lower surfaces, respectively, of the coil holder 130 are provided over and under the coil holder 130, respectively and enclose upper and lower portions, respectively, of the coil holder 130.

A terminal holder 142 is formed on a right end portion of the upper cover 140 in a manner that protrudes upward. The holder terminal 132 of the coil holder 130 is accommodated in the terminal holder 142. Therefore, the holder terminal 132 is inserted, from below, into the terminal holder 142 for being accommodated therein. An upper portion of the terminal holder 142 is formed in such a manner as to be open at the part thereof. A film hole 142a is formed in the upper portion of the terminal holder 142 in a manner that passes therethrough from top to bottom. The lower end portion of the transparent electrode film 240 passes through the film hole 142a.

The upper cover 140 is formed in such a manner as to enclose the coil holder 130. Therefore, an upper edge 144 is formed on an outer circumferential surface of the upper cover 140 in a manner that vertically extends downward therefrom. The upper edge 144 is formed in a manner that has a predetermined height to enclose a flank surface of the coil holder 130.

Like the coil holder 130, the upper cover 140 is formed to the shape of a ring. An upper hole edge 146 corresponding to the upper edge 144 is formed on a hole in a center portion of the upper cover 140 in a manner that extends downward therefrom.

Each of the upper edge 144 and the upper hole edge 146 is formed in such a manner as to be stepped. That is, as illustrated, an edge stepped portion 144a is formed on an internal surface of the upper edge 144, and a hole stepped portion 146a is formed on an outer circumferential surface of the upper hole edge 146. A lower edge 152 and a lower hole edge 154 of the lower cover 150 described below are seated on the edge stepped portion 144a and the hole stepped portion 146a, respectively.

A pair of rib grooves 142b are formed in a left-side surface of the terminal holder 142 in a manner that is cut leftward. That is, as illustrated, the pair of rib grooves 142b are formed on a right-side surface of the terminal holder 142 and a right-side surface of the upper edge 144, and a pair of guide ribs 162 described below are accommodated in the pair of rib grooves 142b.

The fixation guidance piece 148 is further formed on a bottom surface of the upper cover 140 in a manner that protrudes downward therefrom. That is, the fixation guidance pieces 148 constituting a pair are formed in front and rear sides, respectively, of the bottom surface of the upper cover 140 in a manner that protrude downward to having a predetermined height. The fixation guidance pieces 148 serve to support the coil holder 130 in a firmly fixed manner.

Of course, the fixation guidance pieces 148 may be formed on the lower cover 150 instead of on the upper cover 140. It is also possible that the fixation guidance pieces 148 are formed on left and right sides, respectively, of the upper cover 140 instead of in the front and rear sides of the bottom surface of the upper cover 140 or that only one fixation guidance piece 148 is formed. It is also possible that the fixation guidance piece 148 is formed to various shapes, such as a circular shape, instead of to a rectangular shape.

A hook for combination with the lower cover 150 may be formed on the upper cover 140. That is, as illustrated, one or more upper hooks 140a are formed on each of the upper edge 144 and the upper hole edge 146. Specifically, a case is illustrated where three upper hooks 140a are formed: one on a left end portion of the upper hole edge 146 and one on each of the front and rear sides of a right end portion of the upper edge 144.

Like the upper cover 140, the lower cover 150 is formed to the shape of a ring when viewed as a whole. An outer edge that is formed in a manner that vertically extends upward is the lower edge 152. An inner edge that is formed in a manner that extends upward is the lower hole edge 154.

The lower edge 152 and the lower hole edge 154 are formed in such a manner as to have a smaller height than the upper edge 144 and the upper hole edge 146. The lower edge 152 and the lower hole edge 154 are brought into contact with the edge stepped portion 144a and the hole stepped portion 146a, respectively, for being combined therewith. The edge stepped portion 144a and the hole stepped portion 146a are formed on the upper cover 140.

Three lower hooks 150a are on the lower cover 150 in a manner that protrudes upward therefrom. The lower hook 150a is combined with the upper hook 140a, and thus the upper cover 140 and the lower cover 150 are firmly combined with each other. Therefore, the upper hook 140a and the lower hook 150a have shapes, respectively, that correspond to each other and are formed at positions, respectively, that correspond to each other in the upward-downward direction.

As described above, the transparent electrode film 240 is made of a transparent material, such as indium-tin oxide (ITO). The transparent electrode film 240 is configured in such a manner as to have a size corresponding to a length in the upward-downward direction of the container body 100.

The transparent electrode film 240 is provided between the outer container body 110 and the inner container body 120. In this manner, the presence of the transparent electrode film 240 between the outer container body 110 and the inner container body 120 prevents a contact with the food inside the inner container body 120 and blocks an outside foreign material from coming into contact with the outer container body 110 as well.

The transparent electrode film 240 may be attached on a surface of the outer container body 110 or may be attached on a surface of the inner container body 120. That is, the transparent electrode film 240 may be attached on the internal surface of the outer container body 110 or may be attached on an external surface (outer circumferential surface) of the inner container body 120.

A case where the transparent electrode film 240 is attached on the internal surface of the outer container body 110 in a manner that extends longitudinally in the upward-downward direction is described hereinafter as an example.

The transparent electrode film 240, as illustrated, is bent one or more times. A lower end portion thereof passes through the terminal holder 142 of the upper cover 140 and is connected to the holder terminal 132 of the coil holder 130, and an upper end portion thereof is connected to the reed switch 234.

A film guide 160 on which the transparent electrode film 240 is attached is formed on the internal surface of the outer container body 110 in a manner that extends longitudinally in the upward-downward direction. That, as illustrated, the film guide 160 is formed on an internal right-side surface of the outer container body 110 in a manner that extends longitudinally in the upward-downward direction, and thus guides attaching of the transparent electrode film 240.

The film guide 160 is configured to include the pair of guide ribs 162, a guide layer 164, and the like. The pair of guide ribs 162 is formed on a surface (internal surface) of the outer container body 110 in a manner that protrudes in one direction (inward) therefrom. The guide layer 164 is formed between the pair of guide ribs 162.

As illustrated, the guide ribs 162 are formed in a pair in such a manner as to have a predetermined height. The guide ribs 162 extend in parallel with each other in the upward-downward direction with a predetermined distance therebetween.

The guide layer 164 is formed between the pair of guide ribs 162. It is desirable that the guide layer 164 is formed in such a manner as to have a flat surface. That is, the inner container body 120 and the outer container body 110 have a circular cross section, and thus the flank surface of the outer container body 110 has a predetermined radius of curvature. In contrast, the guide layer 164 is formed in such a manner as to have a flat surface.

The flat surface of the guide layer 164 serves to easily attach the transparent electrode film 240 to the guide layer 164. That is, in order to easily attach the transparent electrode film 240 having a flat surface, it is desirable that the guide layer 164 is formed in such a manner as to have a flat surface.

The guide layer 164 may be formed on the surface (internal surface) of the outer container body 110 in a manner that protrudes in one direction (inward) therefrom. Alternative, the guide layer 164 may be formed by recessing the surface (internal surface) of the outer container body 110. That is, the guide layer 164 to be formed on an internal flank surface of the outer container body 110 may be formed in such a manner as to have the same plane as the internal flank surface of the outer container body 110. However, the guide layer 164 may be formed on the internal surface of the outer container body 110 in a manner that protrudes inward therefrom. Alternatively, the guide layer 164 may be formed in the internal surface of the outer container body 110 in a manner that is cut inward from the internal surface.

It is desirable that the guide layer 164 is formed in such a manner as to have a width corresponding to a width of the transparent electrode film 240. That is, because the transparent electrode film 240 is attached on the guide layer 164, it is desirable that the guide layer 164 is formed in such a manner as to have the same width as the transparent electrode film 240 or have a width at least somewhat greater than a width of the transparent electrode film 240.

As described above, the transparent electrode film 240 is mounted on the film guide 160 formed on the internal surface of the outer container body 110 in a manner that extends longitudinally in the upward-downward direction.

The transparent electrode film 240 vertically extends sideways from an upper end portion of the outer container body 110 and a connection portion A of the main handle 302. In this case, in order to prevent the transparent electrode film 240 from breaking off, it is desirable that the connection portion A has a shape of a circular arc having a predetermined radius R. That is, the connection portion A where an upper end portion of the right side of the outer container body 110 and the bottom plate 235a of the mounting support 235 are connected to each other is formed in such a manner as to be rounded with a radius of curvature. It is desirable that the connection portion A is formed in such a manner that the transparent electrode film 240 is seamlessly attached for being mounted.

The magnet groove 126 in which the permanent magnet 232 is accommodated is formed in the upper end portion of the inner container body 120 in a manner that is cut outward. That is, as illustrated (refer to FIG. 7), the right side of the inner container body 120 is partly cut off rightward in such a manner as to be stepped, and thus the magnet groove 126 is formed. The permanent magnet 232 and a magnet holder 404 described below are positioned in the magnet groove 126.

It is desirable that the magnet groove 126 is formed in one side of the switch groove 236. That is, as illustrated (refer to FIG. 7), the magnet groove 126 is formed in the left side of the switch groove 236 in which the reed switch 234 is accommodated. Therefore, the reed switch 234 accommodated in the switch groove 236 and the permanent magnet 232 are in proximity to each other, and thus the reed switch 234 operates by the permanent magnet 232.

The container lid 400 is configured to include an outer wall 410, an inner wall 420, an upper circular plate 430, and the like. The outer wall 410 is formed in such a manner as to have the shape of a circular ring and provides an exterior appearance of the cover casing 420. The inner wall 420 is formed in such a manner as to have a smaller diameter than the outer wall 410 and to have the cover hole 401 in the center thereof. The upper circular plate 430 connects respective upper ends of the outer wall 422 and the inner wall 424 to each other.

Specifically, the container lid 400 is formed to a shape of a circular ring of a predetermined width that is closed at the top, when viewed as a whole. That is, the cover hole 401 described below is formed in a center portion of the container lid 400 in a manner that passes through the center portion thereof from top to bottom. The contain lid 400 has a circular-ring structure that has a longitudinal cross-sectional area in the shape of "∩".

The container lid 400 serves to cover the top of the container body 100. The cover hole 401 is formed in the center portion of the container lid 400 in a manner that passes through the center portion thereof from top to bottom. The cap 450 is detachably mounted in the cover hole 401. That is, as illustrated, the cover hole 401 is formed in the center portion of the container lid 400 in a manner that passes through the center portion thereof from top to bottom. The cover hole 401 is opened and closed by the cap 450.

The cap 450 is configured to include an upper surface plate 460, a cap body 470, and the like. The upper surface plate 460 is exposed to the outside at an upper surface of the container lid 400. The cap body 470 is accommodated in the cover hole 401.

The cap body 470, as illustrated, is formed to a shape of a truncated cone that has an empty space inside when viewed as a whole. That is, the cap body 470 is formed to a shape of a truncated cone of which a cross-sectional diameter gradually decreases toward an upper side thereof.

The upper surface plate 460 opens and closes the tip of the cap body 470. As illustrated, the upper surface plate 452 is formed in such a manner as to have a greater diameter than an end portion of the cap body 470.

An intermediate ring 472, a lower ring 474, and the like are provided on the cap body 470. The intermediate ring 472 is formed in a manner that protrudes outward, and thus is brought into contact with an internal surface of an upper end portion of the cover hole 401. The lower ring 474 is formed on an outer circumferential surface of a lower end portion of the cap body 470 in a manner that protrudes outward therefrom, and thus is brought into contact with an internal surface of a lower end portion of the cover hole 401.

Specifically, the intermediate ring 472 is formed on a center portion of the cap body 470 in a manner that protrudes outward therefrom. When the cap 450 is mounted on the container lid 400, the intermediate ring 472 lies in the same plane with the upper circular plate 430 of the container lid 400. Therefore, an upper portion of the intermediate ring 472 is exposed to the outside at the top of the container lid 400.

An air groove 476 is further formed in the intermediate ring 472.

The air groove 476 serves to allow air to flow through the intermediate ring 472 on the cap 450 in the upward-downward direction. As illustrated, the air groove 476 is formed in a manner that is cut inward from an outer circumferential surface of the intermediate ring 472.

As illustrated, the lower ring 474 is formed on the outer circumferential surface of the lower end portion of the cap body 470 in a manner that extends outward therefrom. An outer circumferential surface of the lower ring 474 is brought into contact with an inner circumferential surface of a lower end portion of the inner wall 420 of the container lid 400.

As illustrated, it is desirable that the outer wall 410 is formed in such a manner as to have a height corresponding to a height of the inner wall 420 or is formed in such a manner as to have a greater height than the inner wall 420.

The gasket 402 described above is provided on an outer circumferential surface of a lower end portion of the outer wall 410. It is desirable that the gasket 402 is made of an elastic material, such as rubber.

An intermediate jaw 422 and a lower jaw 424 are formed on an internal surface of the inner wall 420 in a manner that protrudes inward. The intermediate jaw 422 supports a lower end portion of the intermediate ring 472 of the cap 450. The lower jaw 424 is brought into contact with an external surface of the lower ring 474.

As illustrated, the intermediate jaw 422 is formed on the internal surface of the inner wall 420 in a manner that protrudes inward therefrom to have a predetermined thickness. It is desirable that a plurality of intermediate jaws 422 is formed in such a manner as to be spaced apart. Therefore, it is possible that the air flows through a space between the plurality of intermediate jaws 422 in the upward-downward direction.

The lower jaw 424 is formed on an internal surface of the lower end portion of the inner wall 420 in a manner that protrudes inward therefrom. As illustrated, it is desirable that the lower jaw 424 is formed in a manner that protrudes more inward than the intermediate jaw 422.

A fastening protrusion 478 is further formed on the lower end portion of the cap 450 in a manner that protrudes outward therefrom. A locking path 440 is formed on a lower end portion of the inner wall 420. The locking path 400 serves to accommodate the fastening protrusion 478 and to prevent the accommodated fastening protrusion 478 from deviating therefrom.

More specifically, the fastening protrusion 478 is formed on the outer circumferential surface of the lower ring 474 of the cap 450 in a manner that protrudes outward therefrom. The fastening protrusion 478 serves to prevent the cap 450 mounted on the container lid 400 from deviating from the container lid 400.

The locking path 440 serves to accommodate the fastening protrusion 478, and thus to prevent the accommodated fastening protrusion 478 from deviating therefrom. The locking path 440 is configured to include an access groove 442, a locking groove 444, and the like. The access groove 442 is formed in a manner that is cut inward from an inner circumferential surface of the lower jaw 424 of the inner wall 420, and guides moving of the fastening protrusion 478 in the upward-downward direction. The locking groove 444 is formed in a lower end portion of the access groove 442 in a manner that extends sideways therefrom, and prevents the fastening protrusion 478 from deviating upward.

That is, as illustrated, one portion of the lower jaw 424 is cut off, and thus the access groove 442 is formed. The access groove 442 extends a predetermined distance downward and then vertically extends sideways. Then, the access groove 442 communicates with the locking groove 444 that further extends a predetermined distance sideways.

Therefore, the fastening protrusion 478 moves downward along the access groove 442, moves sideways, and is accommodated in the locking groove 444. When accommodated, the fastening protrusion 478 is prevented from deviating from the locking groove 444.

Of course, the access groove 442 and the locking groove 444 also serve to create a gap between the cap 450 and the container lid 400 and further serves as a path along which the air flows through the container lid 400 from top to bottom. That is, it is possible that the air flows into and out of the container body 100 through the locking path 440, the air groove 476, and the like.

The reason why the air is enabled to flow into and out of the container body 100 along the locking path 440 and the air groove 476 that are not positioned in a straight line in the upward-downward direction is that, when food is chopped into small pieces and mixed inside the container body 100, there is a need to prevent a pressure difference from occurring between the inside and the outside of the container body 100 and to prevent the food inside the container body 100 from being discharged to the outside.

A magnet holder 404 is further provided on the outer circumferential surface of the container lid 400. That is, as illustrated, the magnet holder 404 is formed in the outer circumferential surface of the container lid 400 in a manner that protrudes outward. The permanent magnet 232 is inserted into the magnet holder 404.

When the container lid 400 is attached on the upper surface of the container body 100 or detached therefrom, the permanent magnet 232 serves to perform control to turn on and off the reed switch 234.

The container body 100 is formed in such a manner that a bottom surface thereof has a shape corresponding to a shape of the upper surface of the main body 500. With this configuration, the container body 100 is easily attached and detached on and from the upper surface of the main body 500.

More specifically, the container body 100 is seated on the seating support 900 of the main body 500 described below.

The container body 100 is formed in such a manner that the bottom surface thereof has a shape corresponding to a shape of an upper end portion of the main body 500. Thus, the container body 100 is seated on the main body 500 and is easily removed therefrom.

An edge rim 170 of a predetermined width is formed on the bottom surface of the container body 100 in a manner that protrudes downward. The edge rim 170 is brought into contact with an upper surface of a lower rim 910 of the seating support 900 on the main body 500. The edge rim 170 is formed to a shape corresponding to a shape of an upper surface of the lower rim 910. The lower rim 910 will be described below.

One part of a center portion of the bottom surface of the container body 100 is recessed in the upward direction, and thus an upper-rim accommodation groove 172 is formed. That is, the one part of the center portion of the bottom surface of the container body 100 is recessed in the upward direction inward from the edge rim 170 of the container body 100, and thus the upper-rim accommodation groove 172 is formed. When the container body 100 is seated on the main body 500, an upper rim 920 of the seating support 900 on the main body 500 is accommodated in the upper-rim accommodation groove 172. The upper rim 920 will be described below.

The edge rim 170 is formed to a shape of a circular ring that has an opening at one portion thereof. A coil seating part 940 described below is accommodated in this opening. That is, the edge rim 170 is open at the right ends, and thus a coil seating groove 170a is formed. The coil seating part 940 described below is accommodated in the coil seating groove 170a.

One part of the center portion of the bottom surface of the container body 100 protrudes downward, and thus a circular rim 174 is formed. That is, the center portion of the upper-rim accommodation groove 172 includes the circular rim 174 protruding downward.

As illustrated, the circular rim 174 has the shape of a circular ring. The circular rim 174 is open at the center. The circular rim 174 provides a path along which the blade assembly 200 and the motor assembly 600 may be connected to each other.

The circular rim 174 is accommodated in a circular-rim accommodation groove 980 formed in the main body 500. The circular-rim accommodation groove 980 will be described below.

A plurality of mounting protrusions 174a that protrude radially is further provided on an outer circumferential surface of the circular rim 174. The mounting protrusion 174a serves to hold the container body 100 firmly at its home position on the main body 500 and to keep the container body 100 stationary without being rotated. One or more mounting protrusions 174a are provided.

According to the present disclosure, an example is illustrated where four mounting protrusions 174a are provided. It is desirable that the mounting protrusion 174a is formed in such a manner that the farther an end thereof extends outward from the outer circumferential surface of the circular rim 174, the more decreased a diameter thereof. The reason for this is to easily accommodate the mounting protrusion 174a in the protrusion groove 982 described below.

Figure 17:
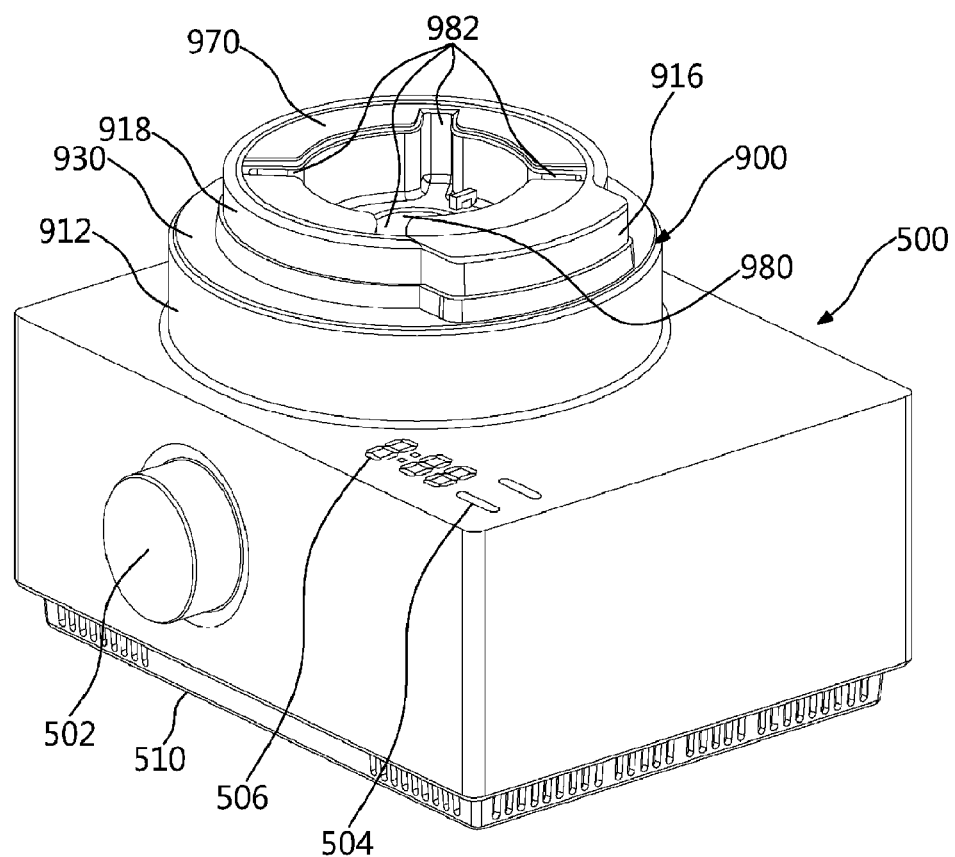
FIG. 17 is a perspective view illustrating a main body that constitutes the blender according to an embodiment of the present disclosure.
Figure 18:
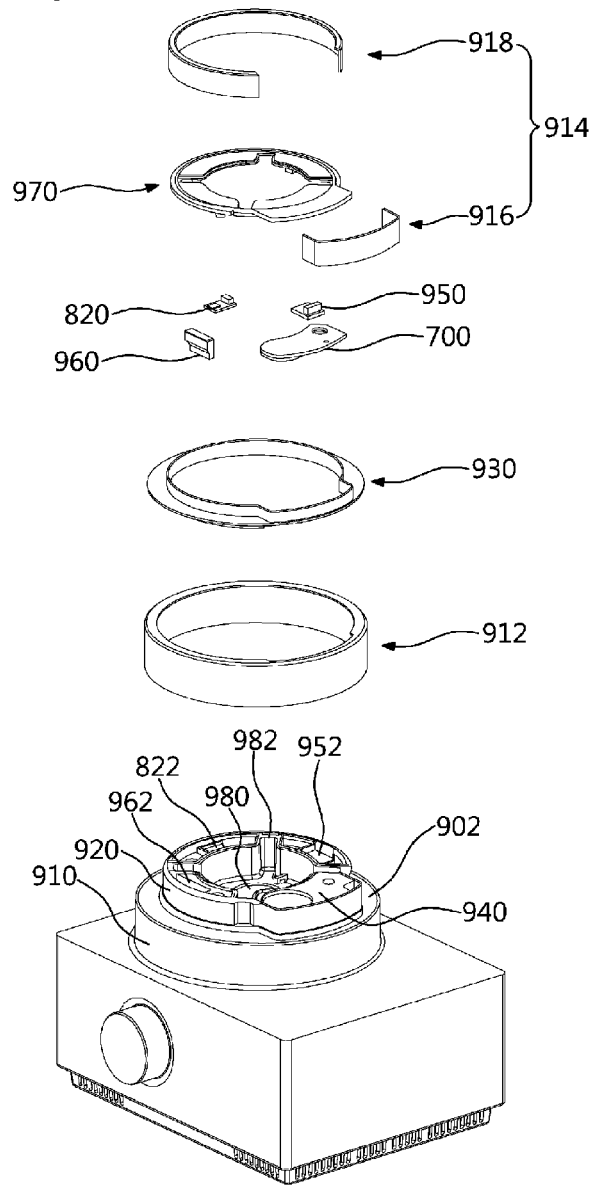
FIG. 18 is an exploded perspective view illustrating components in the upper half of the main body that constitutes the blender according to the embodiment of the present disclosure.
Figure 19:
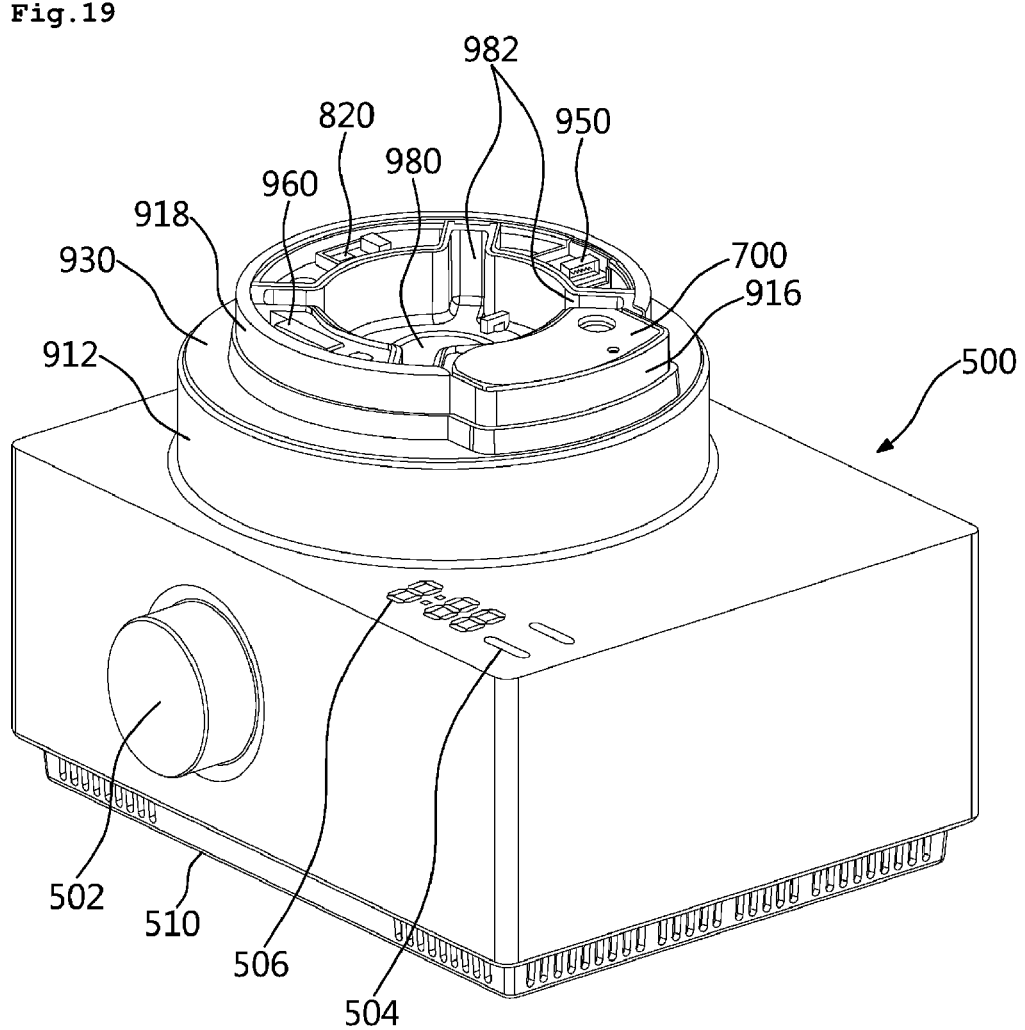
FIG. 19 is a perspective view illustrating a state where a cover is removed from the main body that constitutes the blender according to the embodiment of the present disclosure.

FIGS. 17 to 19 are views each illustrating in detail components in an upper half of the main body 500. FIG. 17 is a perspective view illustrating the main body 500. FIG. 18 is an exploded perspective view illustrating the components in the upper half of the main body 500. FIG. 19 is a perspective view illustrating a state where a cover is removed from the main body 500.

As illustrated in FIGS. 17 to 19, the seating support 900 is provided on the upper surface of the main body 500 in a manner that protrudes upward to be stepped. The bottom of the container body 100 is seated on the seating support 900.

The lower end portion of the container body 100 is seated on the seating support 900 and is supported thereon. Therefore, it is desirable that the seating support 900 is formed in such a manner as to have a shape corresponding to a shape of the lower end portion of the container body 100.

Specifically, the seating support 900 is configured to include the lower rim 910, the upper rim 920, and the like. The lower rim 910 is formed in such a manner as to be stepped and has a diameter corresponding to a diameter of the lower end portion of the container body 100. The upper rim 920 is formed in such a manner as to protrude upward from the lower rim 910 and has a smaller diameter than the lower rim 910.

As illustrated, the lower rim 910 is formed in such a manner as to have a circular shape and a predetermined height. The upper rim 920 having a smaller diameter than the lower rim 910 is formed on the upper surface of the lower rim 910 in such a manner as to protrude upward therefrom to a predetermined height.

Therefore, it is desirable that a step surface 902, like the upper surface of the main body 500, is in the horizontal plane formed between the lower rim 910 having a relatively great diameter and the upper rim 920 having a relatively small diameter. That is, it is desirable that the step surface 902 is formed in such a manner as to be in parallel with the upper surface of the main body 500.

An exterior ring 912 and an upper end ring 914 are provided on external surfaces, respectively, of the lower rim 910 and the upper rim 920. The exterior ring 912 and an upper end ring 914 have shapes corresponding to shapes, respectively, of the external surfaces of the lower rim 910 and the upper rim 920. The exterior ring 912 and the upper end ring 914 are provided on outer circumferential surfaces, respectively, of the lower rim 910 and the upper rim 920 that have a circular external surface, and thus enclose external surfaces (flank surfaces), respectively, of the lower rim 910 and the upper rim 920.

The exterior ring 912 and the upper end ring 914 serve to protect components inside and serve as an exterior material. Therefore, it is desirable that like the exterior handle 304, the exterior ring 912 and the upper end ring 914 are made of an antirust material having a smooth surface, such as a stainless steel material.

An elastic member 930 made of an elastic material is further provided on the step surface 902 between the upper rim 920 and the lower rim 910. It is desirable that as illustrated, the elastic member 930 is formed in such a manner as to cover the step surface 902 formed on the upper surface of the lower rim 910 and to enclose a lower portion of the upper rim 920.

The elastic member 930 is made of an elastic material, and thus serves as a cushion that absorbs shock when the container body 100 is placed on the main body 500. That is, when the bottom surface of the container body 100 is brought into contact with the upper rim 920, the elastic member 930 also serves to prevent the upper rim 920 and the lower rim 910 on the main body 500, which are made of a solid material, and the bottom surface of the container body 100 from being damaged or from generating noise due to collision with each other.

In this manner, the elastic member 930, made of a material, such as rubber, is used to smoothly seat the container body 100 on the main body 500 without any shock. In addition, conductivity rubber may be used whenever necessary. In this case, conductivity rubber may also be provided on the bottom of the container body 100.

The electric power transmission unit 700 and the optical reception module 820 are mounted on an upper surface of the upper rim 920.

More specifically, a right-side surface of the upper rim 920 further protrudes rightward, and the coil seating part 940 is formed on the right-side surface thereof. The electric power transmission unit 700 is mounted on an upper surface of the coil seating part 940.

The electric power transmission unit 700 is positioned adjacent to the electric power reception unit 220 provided on the container body 100 and serves to supply electric power to the electric power reception unit 220. Therefore, it is desirable that the electric power transmission unit 700 is configured as an induction coil. That is, like the electric power reception unit 220, the electric power transmission unit 700 may be configured as an induction coil wound a number of times in helical form on a core (not illustrated) on the same surface and may be mounted on a PCB.

In addition, although not illustrated in detail, an oscillation circuit unit may be provided inside the main body 500. The oscillation circuit unit may generate electric power and may apply electric current to the electric power transmission unit 700. A magnetic field may be produced by the electric current applied to the electric power transmission unit 700. Then, the oscillation circuit unit may change strength of the electric current that is applied to the electric power transmission unit 700, and the change in the strength of the electric current changes the magnetic field in the electric power transmission unit 700.

Therefore, according to the present disclosure, when the electric power reception unit 220 and the electric power transmission unit 700 are mounted in such a manner as to correspond to each other in the upward-downward direction, the strength of the electric current that is applied to the electric power transmission unit 700 is changed, and the magnetic field in the electric power transmission unit 700 is accordingly changed. Thus, inductive coupling between the electric power transmission unit 700 and the electric power reception unit 220 changes magnetic flux passing through the electric power reception unit 220. Consequently, an induced electromotive force develops in the electric power reception unit 220. This induced electromotive force may also be supplied to the optical transmission module 810.

The optical reception module 820 is provided in a direction opposite to a direction of the electric power transmission unit 700. That is, it is desirable that the optical reception module 820 is provided in a reception groove 822 formed in an upper surface of a left end portion of the upper rim 920. The reception groove 822 is positioned in a manner that corresponds in the upward-downward direction to the optical transmission module 810 mounted on the container body 100.

More specifically, the reception groove 822 of a predetermined size is formed in the upper surface of the left end portion of the upper rim 920 in a manner that is cut downward. The optical reception module 820 is fixedly mounted in the reception groove 822.

It is desirable that the optical reception module 820, as described above, includes a photosensor or photodetector. The optical reception module 820 may receive light transmitted by the optical transmission module 810 and may transmit this received optical signal.

Of course, the optical reception module 820 and the electric power transmission unit 700 may be mounted on one portion of an upper surface of the seating support 900 in such a manner as to be in proximity to each other.

That is, as illustrated, the electric power reception unit 220 and the optical transmission module 810 are configured to be mounted on the right end portion and left end portion, respectively, of the coil holder 130 in such a manner as to be spaced apart from each other. In addition to this configuration, in a case where the electric power reception unit 220 and the optical transmission module 810 are both configured to be mounted on one of the right end portion and the left end portion of the coil holder 130 in such a manner as to be in proximity to each other, it is desirable that the electric power reception unit 220 and the optical transmission module 810 are both mounted on the left side of the seating support 900 or on the right thereof in such a manner as to correspond to each other in the upward-downward direction and in such a manner as to be in proximity to each other.

In this manner, at least a part of the detection system may be provided on the seating support 900. That is, the electric power reception unit 220, the optical transmission module 810, and the like that constitute the detection system may be mounted on the seating support 900.

A Hall sensor 950 and a container body detection switch 960 may be further provided on the upper surface of the upper rim 920. That is, a container body switch groove 962 and a sensor groove 952 are formed in upper surfaces, respectively, of leading and rear end portions of the upper rim 920 in a manner that is cut downward. The container body detection switch 960 and the Hall sensor 950 are fixedly mounted in the container body switch groove 962 and the sensor groove 952, respectively.

The container body detection switch 960 is configured as a reed switch and serves to detect whether or not the container body 100 is seated on the upper surface of the main body 500. In a case where the container body detection switch 960 is mounted, a magnet (not illustrated) corresponding to the container body detection switch 960 is also further provided on the lower end portion of the container body 100.

The Hall sensor 950 serves to determine a type of the container body 100 seated on the main body 500. In this case, a signal transfer unit that corresponds to the bottom surface of the container body 100 may also be necessary.

The upper end ring 914 is mounted an edge of the upper rim 920. It is desirable that the upper end ring 914 is configured in such a manner as to be separated into two pieces. That is, as illustrated, the right-side surface of the upper rim 920 protrudes rightward, and thus the coil seating part 940 is formed. Therefore, the upper end ring 914 is configured to include a protrusion piece 916 and a curvature piece 918. The protrusion piece 916 encloses an external surface of the coil seating part 940. The curvature piece 918 encloses portions other than the external surface thereof.

An upper portion of the upper rim 920 is covered by a cover 970. Therefore, the electric power transmission unit 700, the optical reception module 820, the container body detection switch 960, the Hall sensor 950, and the like that are mounted on the upper rim 920 are covered by the cover 970 for being protected.

In this manner, the cover 970 serves to fix the electric power transmission unit 700, the optical reception module 820, the container body detection switch 960, the Hall sensor 950, and the like, which are mounted on the upper rim 920, at their original positions, respectively, and serves to separate these components from the outside for protection.

It is desirable that the cover 970 is made of a material capable of transmitting light and a signal. That is, the electric power transmission unit 700, the optical reception module 820, the container body detection switch 960, the Hall sensor 950, and the like that are mounted below the cover 970 need to receive a signal, light, and the like that are transmitted from the container body 100. Thus, it is desirable that the cover 970 is made of a material capable of transmitting light and a signal.

A center portion of the seating support 900 is open at the top and bottom. Thus, the blade assembly 200 of the container body 100 and the motor assembly 600 built into the main body 500 are connected to each other.

More specifically, the circular-rim accommodation groove 980 is formed in a center portion of the upper rim 920 in a manner that is cut downward. The above-described circular rim 174 on a lower end of the container body 100 is accommodated in the circular-rim accommodation groove 980. That is, the upper rim 920 has the shape of a circular ring when viewed as a whole. The circular-rim accommodation groove 980 in the shape of a circle is formed in the center portion of the upper rim 920.

One or more protrusion grooves 982 are formed in an internal surface of the upper rim 920. One or more portions of the protrusion groove 982 are recessed outward, and thus one or more circular-rim accommodation grooves 980 are radially formed. The mounting protrusion 174a of the container body 100 is seated in the circular-rim accommodation groove 982.

Therefore, it is desirable that the protrusion grooves 982 are formed in such a manner that the number or sizes thereof correspond to the number or sizes of the mounting protrusions 174a and that the protrusion groove 982 is formed in such a manner that a size thereof corresponds to a size of the mounting protrusion 174a. It is desirable that the protrusion groove 982 is formed in such a manner as to have the same width as or a greater width than the mounting protrusions 174a.

Figure 20:
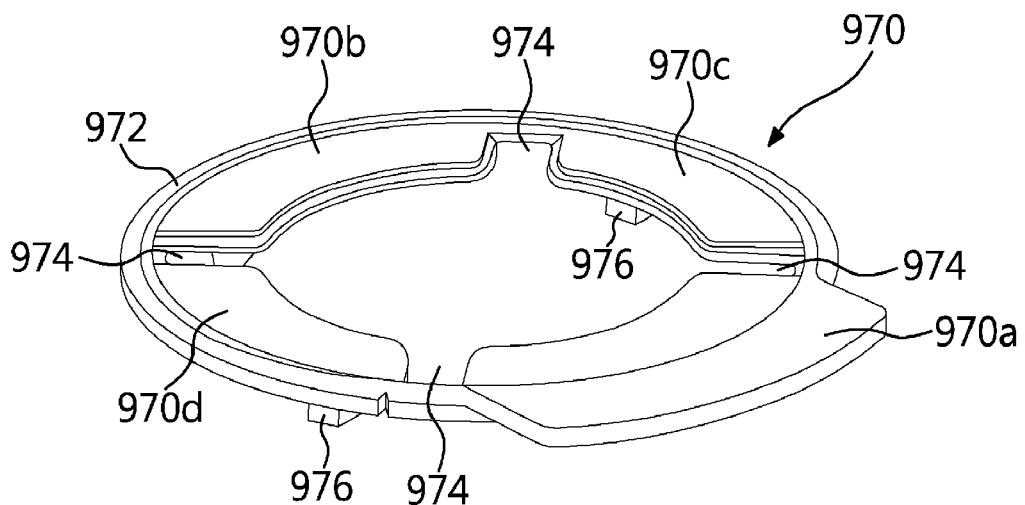
FIG. 20 is a perspective view illustrating a detailed configuration of the cover that constitutes the blender according to the embodiment of the present disclosure.
Figure 21:
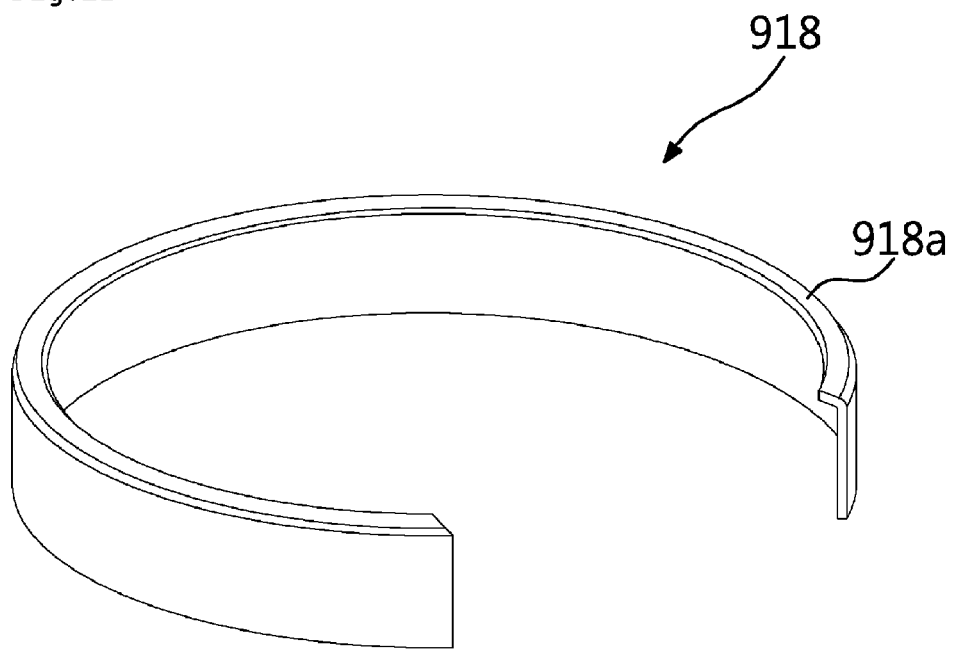
FIG. 21 is a perspective view illustrating a detailed configuration of a curvature piece of an upper end ring that constitutes the blender according to the embodiment of the present disclosure.

FIG. 20 is a perspective view illustrating a detailed configuration of the cover 970. FIG. 21 is a perspective view illustrating a detailed configuration of the curvature piece 918 of the upper end ring 914.

As illustrated in FIGS. 20 and 21, the curvature piece 918 is mounted in such a manner as to enclose a flank surface of the upper rim 920. An upper-end rim 918a is further formed on an upper end portion of the curvature piece 918 in a manner that vertically extends inward therefrom. The upper-end rim 918a encloses a cover edge 972 of the cover 970 described below.

The cover 970 is configured to include the cover edge 972 in the shape of a circle and cover portions 970a, 970b, 970c, and 970d, and the like. The cover portions 970a, 970b, 970c, and 970d are integrally formed with the cover edge 972 and cover components, respectively, that are provided thereunder.

Specifically, the cover edge 972 of a circular ring of the cover 970 is formed to a shape of a circular ring. The cover portions 970a, 970b, 970c, and 970d are formed on front, rear, left, and right sides, respectively, of the cover edge 972.

The cover portions 970a, 970b, 970c, and 970d are referred to as a coil cover portion 970a, a reception cover portion 970b, a sensor cover portion 970c, and a container body cover portion 970d, respectively.

The coil cover portion 970a, as illustrated, is formed on a right end portion of the cover edge 972 and covers the upper surface of the coil seating part 940. The reception cover portion 970b is formed on a left end portion of the cover edge 972, which is opposite in direction to the coil cover portion 970a, and covers an upper surface of the reception groove 822 in which the optical reception module 820 is fixedly mounted.

The container body cover portion 970d and the sensor cover portion 970c are formed on a front end portion and a rear end portion, respectively, of the cover edge 972.

The container body cover portion 970d and the sensor cover portion 970c covers upper surfaces, respectively, of the container body detection switch 960 and the Hall sensor 950 that are fixedly mounted in the container body switch groove 962 and the sensor groove 952, respectively, in the upper surface of the upper rim 920.

It is desirable that upper surfaces of the cover portions 970a, 970b, 970c, and 970d are formed in such a manner as to protrude upward above an upper surface of the cover edge 972. That is, as illustrated, the upper surfaces of cover portions 970a, 970b, 970c, and 970d protrude upward above the cover edge 972.

The cover edge 972 is formed in such a manner that the upper surface thereof corresponds to the upper-end rim 918a of the curvature piece 918. Therefore, when the cover 970 and the curvature piece 918 are mounted on the upper rim 920, the upper-end rim 918a of the curvature piece 918 pushes the cover edge 972 of the cover 970 from above to fix the cover edge 972.

A cover groove 974 is formed between each of the cover portions 970a, 970b, 970c, and 970d. The cover groove 974 is formed at a position that corresponds to a position of the protrusion groove 982 in the upward-downward direction. When the container body 100 is mounted on the main body 500, the mounting protrusion 174a of the container body 100 is seated in or passes through the cover groove 974.

A cover rib 976 may be further formed on the cover portions 970a, 970b, 970c, and 970d or the cover edge 972 in a manner that protrudes downward therefrom. The cover rib 976 serves to easily combine the cover 970 with the upper surface of the upper rim 920.

Figure 22:
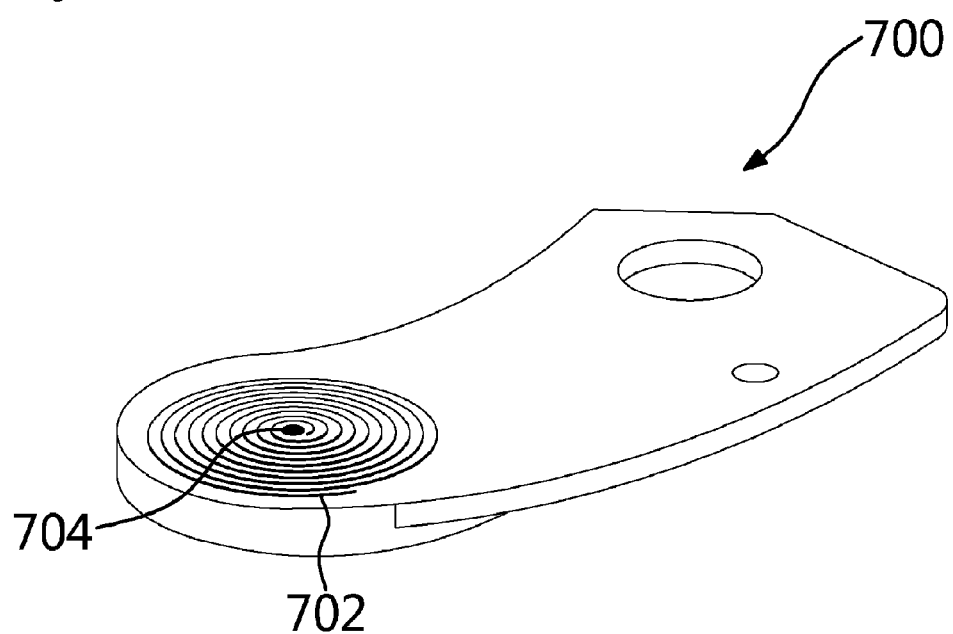
FIG. 22 is a perspective view illustrating an implementation example of the electric power transmission unit that constitutes the blender according to the embodiment of the present disclosure.
Figure 23:
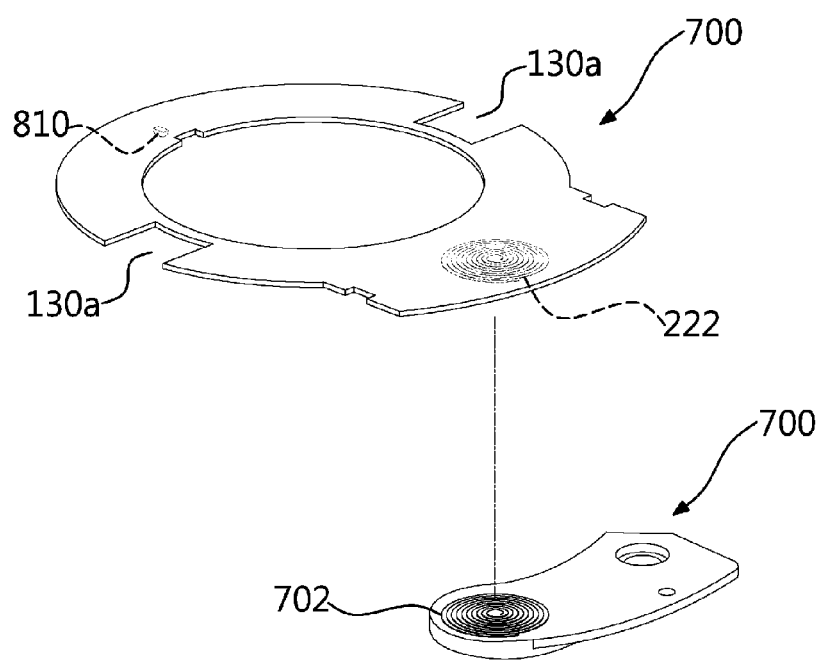
FIG. 23 is an exploded perspective view illustrating an arrangement of an electric power transmission unit and a coil holder in relation to each other.
Figure 24:
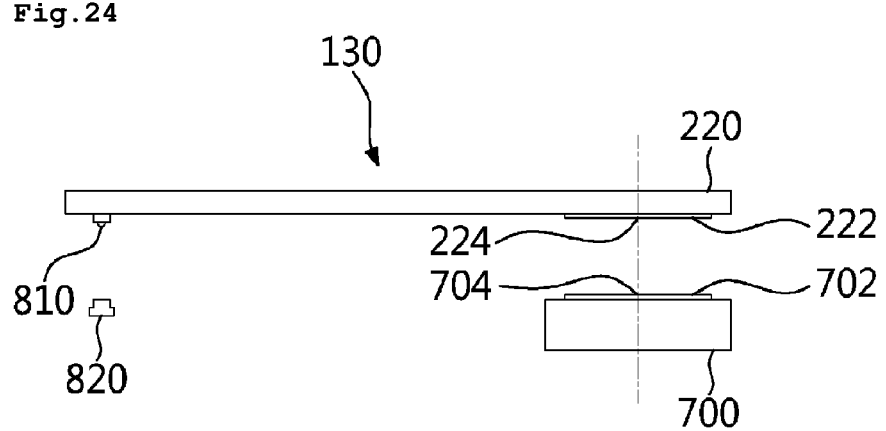
FIG. 24 is a front exploded view illustrating the arrangement of the electric power transmission unit and the coil holder in relation to each other.

FIG. 22 illustrates an example of a configuration of the electric power transmission unit 700. FIGS. 23 and 24 illustrate an example of an arrangement of the electric power transmission unit 700 and the coil holder 130. FIG .22 is a perspective view illustrating an implementation example of the electric power transmission unit 700 that constitutes the blender according to the embodiment of the present disclosure. FIG. 23 is an exploded perspective view illustrating the arrangement of the electric power transmission unit 700 and the coil holder 130 in relation to each other. FIG. 24 is a front exploded view illustrating the arrangement of the electric power transmission unit 700 and the coil holder 130 in relation to each other.

As described above, the electric power transmission unit 700 may be mounted at one position in an upper portion of the main body 500.

The electric power transmission unit 700 may be realized as a transmission induction coil 702 patterned in the same plane on a PCB. The transmission induction coil 702 may be configured as an induction coil wound a number of times in helical form on a transmission core 704 on a PCB.

The main body 500 may have an oscillation circuit unit (not illustrated) inside. The oscillation circuit unit (not illustrated) may apply electric current to the transmission induction coil 702. When the electric current is applied to the transmission induction coil 702, a magnetic field may be produced at the transmission induction coil 702.

The oscillation circuit unit (not illustrated) may be mounted on the electric power transmission unit 700. The oscillation circuit unit (not illustrated) may change the strength of electric current applied to the transmission induction coil 702. The change in the strength of electric current may change the magnetic field at the transmission induction coil 702.

It is desirable that the optical transmission module 810 and the optical reception module 820 are positioned in such a manner as to be in proximity to each other. As illustrated, when the container body 100 is mounted on the main body 500, the optical transmission module 810 and the optical reception module 820 are positioned in proximity to each other in the upward-downward direction.

When the optical reception module 820 receives a signal of the optical transmission module 810, the motor assembly 600 may be driven.

As in the implementation example illustrated, it is desirable that when the container body 100 is seated on the main body 500, the transmission induction coil 702 of the main body 500 and the reception induction coil 222 of the container body 100 are arranged at positions, respectively, that correspond to each other, in such a manner as to be spaced apart.

Specifically, when the container body 100 is seated on the main body 500, it is desirable that the transmission induction coil 702 constituting the electric power transmission unit 700 and the reception induction coil 222 constituting the electric power reception unit 220 are arranged in such a manner that the transmission and reception cores 704 and 224 and the transmission induction coil 702 and the reception induction coil 222 face each other in parallel with each other.

Under a specific condition, inductive coupling may be selectively performed between the transmission induction coil 702 constituting the electric power transmission unit 700 and the reception induction coil 222 constituting the electric power reception unit 220.

The change in the strength of the electric current applied to the transmission induction coil 702 changes the magnetic field at the transmission induction coil 702. The inductive coupling between the transmission induction coil 702 and the reception induction coil 222 changes magnetic flux passing through the reception induction coil 222. Thus, an induced electromotive force develops in the reception induction coil 222.

Therefore, it is desirable that the positions of the transmission induction coil 702 and the reception induction coil 222 and the arrangement thereof are determined in such a manner that the inductive coupling therebetween is successfully performed.

In addition, as described above, the optical transmission module 810 transmitting a signal to the outside is provided in a lower portion of the container body 100. According to the present embodiment, a case is illustrated where the optical transmission module 810 is mounted on a lower surface of the left end portion of the coil holder 130.

It is desirable that the reception induction coil 222 of the coil holder 130 and the optical transmission module 810 are electrically connected to each other. The optical transmission module 810 is supplied with electric power from the reception induction coil 222, and thus may transmit a signal.

The optical transmission module 810 may transmit a signal to the optical reception module 820 provided in the main body 500. That is, the optical reception module 820 may receive the signal transmitted by the optical transmission module 810.

Therefore, it is desirable that the optical transmission module 810 and the optical reception module 820 are arranged at positions, respectively, that face each other, in such a manner that transmission and reception of the signal therebetween are smoothly performed. According to the present embodiment, the container body 100, when combined with the main body 500, is positioned in such a manner as to be spaced apart in the upward-downward direction from the main body 500.

As described above, according to the embodiment of the present disclosure, the optical transmission module 810, for example, may include a light source that emits light, and the optical reception module 820 may include an optical sensor that detects the emitted light. The light sources may include a LED, and the optical sensor may be realized as a semiconductor element, a photodiode, a phototransistor, or the like.

Operation of the blender according to the present disclosure that has the configuration as described above will be described below with reference to the accompanying drawings.

The container body 100 is seated on the main body 500 as illustrated in FIG. 1. In this state, the blender according to the present disclosure is ready for use.

First, electric power needs to be supplied from the outside in order to use the blender. It is possible that the wireless electric power module 520 supplies the electric power in a wireless manner. That is, it is possible that the electric power is supplied from the outside using an induced electromotive force. Of course, it is also possible that the electric power is supplied in a wired manner.

The wireless electric power module 520 supplies the electric power to components, such as the motor assembly 600, the touch operation unit 504, and the electric power transmission unit 700, that need the electric power for operating. The user may operate the blender or may stop the blender by operating the touch operation unit 504 or the knob 502.

For example, when the user operates the touch operation unit 504 or the knob 502, the motor assembly 600 operates, the blades of the blade assembly 200 are rotated, and then food is chopped into small pieces.

At this time, the detection system determines whether or not the container lid 400 is attached. In this case where the container lid 400 is not attached, the motor assembly 600 and the blade assembly 200 do not operate.

Specifically, the reed switch 234 is turned off when the blender is not in use. Therefore, the electric power reception unit 220, the reed switch 234, the optical transmission module 810, and the like do not form a closed circuit within the container body 100, and thus light reception does not occur in the optical reception module 820.

In this manner, when the light reception does not occur in the optical reception module 820, with no signal representing the non-occurrence of the light reception, the motor assembly 600 is blocked from receiving electric power.

When the container lid 400 is attached in this state, the permanent magnet 232 of the container lid 400 is positioned in proximity to the reed switch 234, and thus the reed switch 234 is turned on. In return, the electric power reception unit 220, the reed switch 234, the optical transmission module 810, and the like form the closed circuit. Accordingly, the optical reception module 820 receives light that occurs in the optical transmission module 810.

Thus, when it is detected that the container lid 400 is attached, the motor assembly 600 starts to operate according to the user's operation. The food inside the container body 100 is chopped into small pieces. Of course, at this time, it is desirable that the container body detection switch 960 or the like also detects whether or not the container body 100 is mounted on the main body 500, and thus that the motor assembly 600 starts to operate.

At this time, an operating state of the blender according to the present disclosure is displayed on the display unit 506 or the like for being viewed from the outside. Thus, the user may visually recognize the operating state, operation time, and the like of the blender.

When attaching or detaching the container lid 400 on and from the container body 100, the user attaches or detaches the container lid 400 while holding an upper portion of the cap 450 with their hand. The user presses the container lid 400 in a direction of motion from upward to downward, and thus the container lid 400 is brought into contact with the upper surface of the container body 100 and thus is fixed thereto. At this time, the gasket 402 provided on an external surface of the container lid 400 bridges a gap between the container lid 400 and the container body 100.

In addition, the user may separate the cap 450 mounted on the center portion of the container lid 400 from the center portion thereof. As described above, the user may perform this separation operation by rotating the cap 450 while holding the upper end portion thereof with their hand.

For example, in order to mount the cap 450 on the container lid 400, while holding the upper end portion of the cap 450 with their hand, the user enables the fastening protrusion 478 of the cap 450 to pass through the access groove 442 in the container lid 400 from top to bottom, and thus rotates the fastening protrusion 478 clockwise. When this operation is performed, the fastening protrusion 478 is accommodated in the locking groove 444. Thus, the cap 450 is completely mounted. At the same time, the cap 450 is prevented from deviating upward.

In this state, when the user rotates the cap 450 counterclockwise while holding the upper end portion of the cap 450, the fastening protrusion 478 moves from the locking groove 444 and is positioned under the access groove 442. In this state, when the user pulls up the cap 450, the fastening protrusion 478 passes through the access groove 442 from bottom to top. Thus, the cap 450 is separated from the container lid 400.

In a state where the cap 450 is mounted on the container lid 400, it is possible that air flows through the container lid 400 in the upward-downward direction through the air groove 476. Thus, the container body 100 does not become a vacuum. Accordingly, a pressure difference is prevented from occurring between the inside and the outside of the container body 100.

When the cap 450, as described above, is separated from the container lid 400, the user may place the food into the container body 100 through the cover hole 401 or may stir food inside the container body 100 using a rod or the like.

When with the operation of each of the motor assembly 600 and the blade assembly 200, an operation of chopping food inside the container body 100 into small pieces or an operation of mixing food inside the container body 100 is finished according to the user's intention, the user may lift the container body 100 upward from the main body 500 for being separated therefrom and then may detach the container lid 400 to take the food out of the container body 100.

The present disclosure is not limited to the embodiments described above. It would be apparent to a person of ordinary skill in the art that various modifications will be made to the embodiments of the present disclosure without departing the scope of the present disclosure.

For example, according to the embodiment, the case where the optical transmission module 810 and the optical reception module 820 are mounted on the respective left end portions, respectively, of the container body 100 and the main body 500, is described as an example. However, it is also possible that the optical transmission module 810 and the optical reception module 820 are mounted on respective right end portions, respectively, of the container body 100 and the main body 500, or on respective front or rear end portions, respectively, of the container body 100 and the main body 500.

In addition, according to the present embodiment, the case where only one optical reception module 820 is mounted in the main body 500 is described. However, it is also possible that two or more optical reception modules 820 are mounted in the main body 500. It is also possible that the optical reception module 820 in the shape of a ring is formed on the upper surface of the upper rim 920. In this case, regardless of a direction in which the container body 100 is mounted, it can be detected whether or not the container lid 400 is mounted.

It is also possible that two or more transmission coils, each constituting the electric power transmission unit 700, are mounted. Furthermore, it is also possible that the transmission coil in the shape of a ring is formed on the upper surface of the upper rim 920. In this case, transmission of electric power is possible regardless of a position where the container body 100 is mounted. In addition, the detection system may be configured in various forms. That is, instead of the optical transmission module 810, the optical reception module 820, the electric power transmission unit 700, and the electric power reception unit 220, an electrode plate (not illustrated) may be mounted on each of the container body 100 and the main body 500 and then may be configured in such a manner as to determine whether or not a capacitor is charged and whether or not a capacitance is detected. Various methods including a method in which whether or not a change in a magnetic field occurs at the electric power reception unit 220 is detected using a Hall IC or a reed switch may be also possible.

The invention claimed is:

1. A blender comprising:
a container body in which food is accommodated;
a main body to support the container body, the main body including a seating support;
a container lid to detachably mount on an upper surface of the container body to open and close a top of the container body; and
a detection system to detect whether or not the container lid is mounted on the container body,
wherein the seating support is disposed on an upper surface of the main body in a manner that protrudes upward therefrom, and a bottom surface of the container body is capable of being seated on the seating support;
an electric power transmission unit configured to supply electric power to the container body and an optical reception module configured to receive a signal, which are mounted on the seating support;
an electric power reception unit configured to receive the electric power from the electric power transmission unit and an optical transmission module configured to transmit the signal to the optical reception module in a substantially straight path, which are mounted on the bottom surface of the container body,
wherein based on the bottom surface of the container body seated on the seating support, the electric power transmission unit faces the electric power reception unit and the optical reception module faces the optical transmission module, wherein based on the container lid mounted on the container body, a closed electrical circuit is formed between the electric power reception unit and the optical transmission module, and the optical transmission module is configured to transmit the signal which is powered by the electric power received from the electric power reception unit.

2. The blender of claim 1, comprising one or more components for transferring electric power to or receiving a signal from the container body are mounted at the seating support.

3. The blender of claim 1, comprising a cover to cover an upper surface of the seating support.

4. The blender of claim 3, wherein the cover is made of a material capable of passing the signal.

5. The blender of claim 1, wherein at least a part of the detection system is disposed at least one of the main body and the container body.

6. The blender of claim 5, wherein the at least the part of the detection system is disposed at the seating support.

7. The blender of claim 1, wherein the optical reception module includes an optical sensor configured to receive light and configured to convert the received light into an electric signal.

8. The blender of claim 1, wherein the electric power transmission unit includes an induction coil where an induced electromotive force is able to occur.

9. The blender of claim 1, wherein the electric power transmission unit and the optical reception module are mounted in such a manner as to be spaced apart from each other in opposite directions from a center of the seating support.

10. The blender of claim 1, wherein the electric power transmission unit and the optical reception module are mounted in such a manner as to be in proximity to each other at one portion of the seating support.

11. The blender of claim 1, wherein the seating support comprises a reception groove, and the optical reception module is mounted at the reception groove.

12. The blender of claim 3, wherein the cover is in a shape of a ring.

13. The blender of claim 3, wherein the cover comprises a cover edge having a shape of a ring and one or more cover portions to cover the electric power transmission unit and the optical reception module.

14. The blender of claim 13, wherein the cover edge corresponds to an upper surface of the seating support.

15. The blender of claim 13, upper surfaces of the one or more cover portions are disposed above an upper surface of the cover edge.

16. The blender of claim 7, wherein the cover is made of a material capable of passing light.

* * * * *